United States Patent
Heo et al.

(10) Patent No.: US 11,750,404 B2
(45) Date of Patent: Sep. 5, 2023

(54) DECENTRALIZED GROUP SIGNATURE SCHEME FOR CREDENTIAL SYSTEMS WITH ISSUER ANONYMIZATION

(71) Applicant: ELECTRONICS AND TELECOMMUNICATIONS RESEARCH INSTITUTE, Daejeon (KR)

(72) Inventors: Hwan Jo Heo, Daejeon (KR); Hyun Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 110 days.

(21) Appl. No.: 17/088,998

(22) Filed: Nov. 4, 2020

(65) Prior Publication Data

US 2021/0135879 A1 May 6, 2021

(30) Foreign Application Priority Data

Nov. 5, 2019 (KR) .................. 10-2019-0139894

(51) Int. Cl.
H04L 9/32 (2006.01)
H04L 9/08 (2006.01)

(52) U.S. Cl.
CPC .......... H04L 9/3255 (2013.01); H04L 9/0825 (2013.01); H04L 9/0838 (2013.01); H04L 9/0891 (2013.01); H04L 9/3257 (2013.01)

(58) Field of Classification Search
CPC ... H04L 9/3255; H04L 9/0825; H04L 9/0838; H04L 9/0891; H04L 9/3257
See application file for complete search history.

(56) References Cited

U.S. PATENT DOCUMENTS 7,590,850 B2 9/2009 Kim
8,966,273 B2 2/2015 Hwang et al.
(Continued)

FOREIGN PATENT DOCUMENTS

KR 10-0537514 B1 12/2005

OTHER PUBLICATIONS

Wang, Xiao-Ming, "Distributed and Dynamic Threshold Group Signature Scheme", ICCS 2008.
(Continued)

*Primary Examiner* — Phy Anh T Vu
(74) *Attorney, Agent, or Firm* — LRK PATENT LAW FIRM

(57) ABSTRACT

A decentralized group signature method for an issuer-anonymized credential system includes (a) an initial system setup operation of defining elements of a group signature method and information that is generated and shared by each group member, (b) an initial group member setup operation, (c) a group member participation operation of adding a new group member to a group, (d) a group signature operation of putting a group signature on a specific message, (e) an operation of verifying the group signature, (f) an operation of removing anonymity from a group signature for a specific group member with agreement of group members, and (g) an operation of revoking a specific group member with agreement of the group members. Exclusive authority of a group manager is distributed to the group members.

14 Claims, 20 Drawing Sheets

(56) References Cited

U.S. PATENT DOCUMENTS

| | | | |
|---|---|---|---|
| 9,860,069 B2 | 1/2018 | Morpho | |
| 2003/0177352 A1* | 9/2003 | Camenisch | H04L 9/3218 713/158 |
| 2005/0097316 A1* | 5/2005 | Kim | H04L 9/3255 713/176 |
| 2008/0253292 A1* | 10/2008 | Busser | H04L 67/104 370/241 |
| 2010/0122080 A1 | 5/2010 | Lee et al. | |
| 2020/0320225 A1* | 10/2020 | Irvine | G06F 21/64 |
| 2020/0322175 A1* | 10/2020 | Chen | H04L 9/3066 |
| 2021/0014073 A1* | 1/2021 | Currie | H04L 9/0841 |
| 2021/0091934 A1* | 3/2021 | Fletcher | H04L 9/0847 |
| 2021/0203491 A1* | 7/2021 | Wei | H04W 12/043 |
| 2021/0273807 A1* | 9/2021 | Wertheim | G06F 9/466 |
| 2021/0297251 A1* | 9/2021 | Yang | H04L 9/3247 |
| 2022/0158842 A1* | 5/2022 | Camenisch | H04L 9/3257 |
| 2022/0247574 A1* | 8/2022 | Hoshino | H04L 9/3247 |

OTHER PUBLICATIONS

IBM Research—Zurich, "Specification of the Identity Mixer Cryptographic Library", Version2.3.0, Apr. 29, 2010.

Yisen Cao et al., "Decentralized Group Signature Scheme based on Blockchain, International Conference on Communications, Information System and Computer Engineering", 2019 International Conference on Communications, Information System and Computer Engineering (CISCE).

Nasima Begum et al., "Efficiency Improvement in Group Signature Scheme with Probabilistic Revocation, Journal of nfomnation Processing vol. 27", Journal of Information Processing vol. 27 508-516 (Sep. 2019).

* cited by examiner

FIG. 3
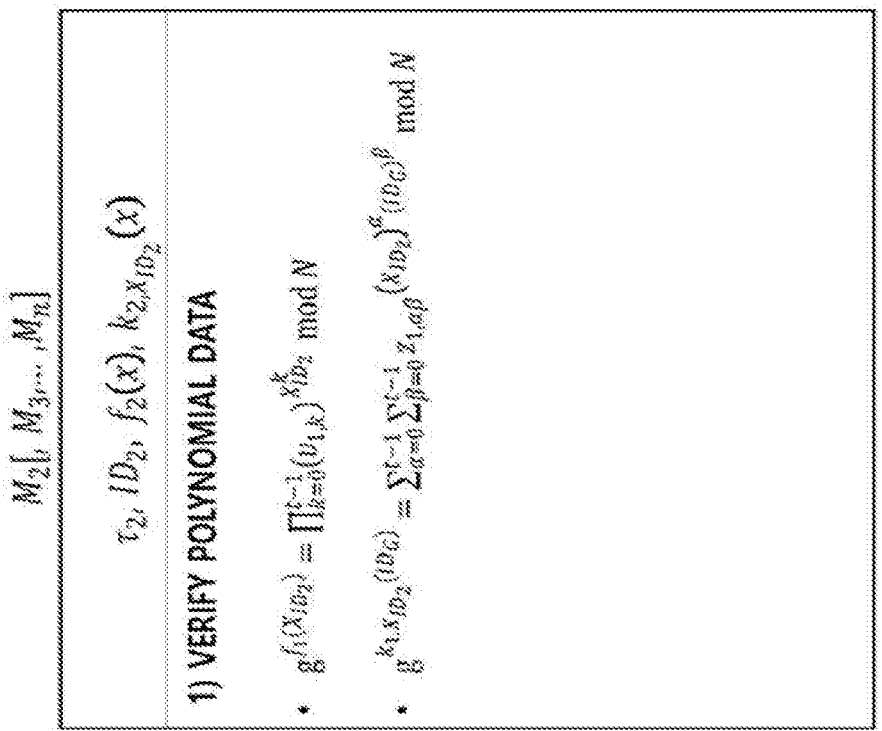
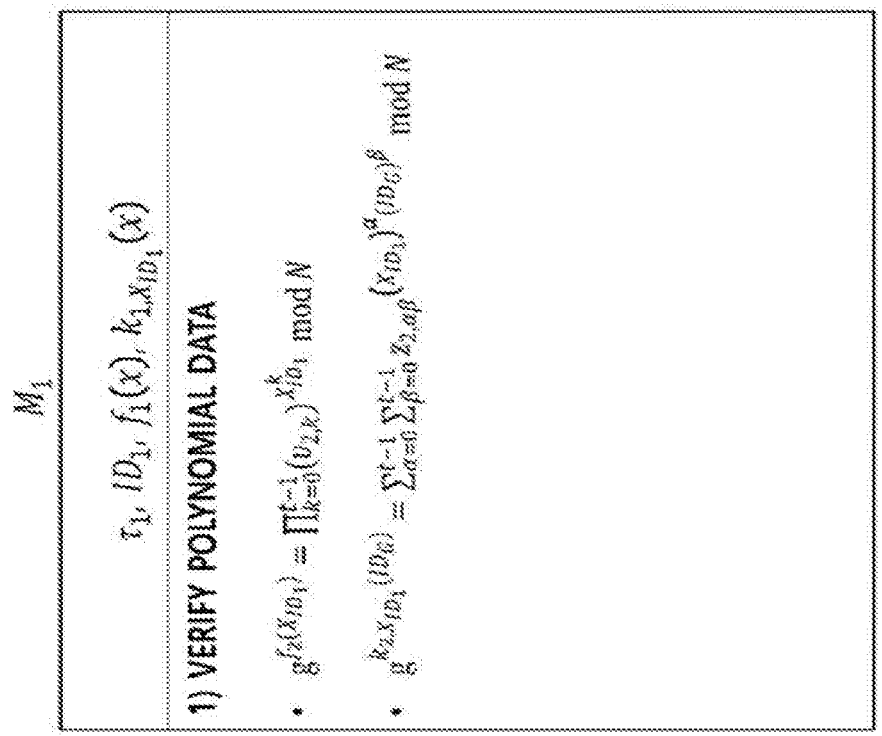

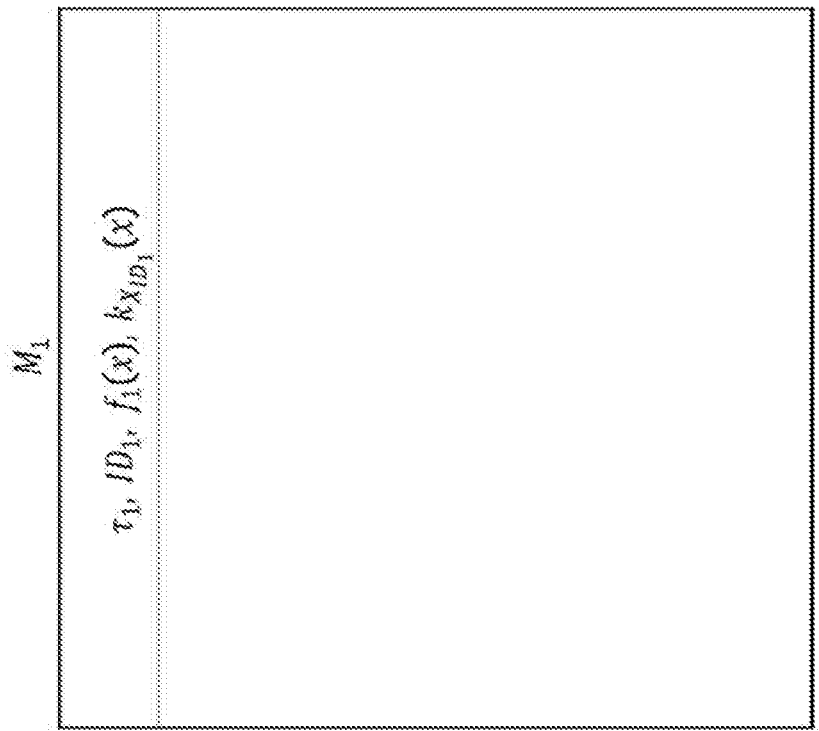
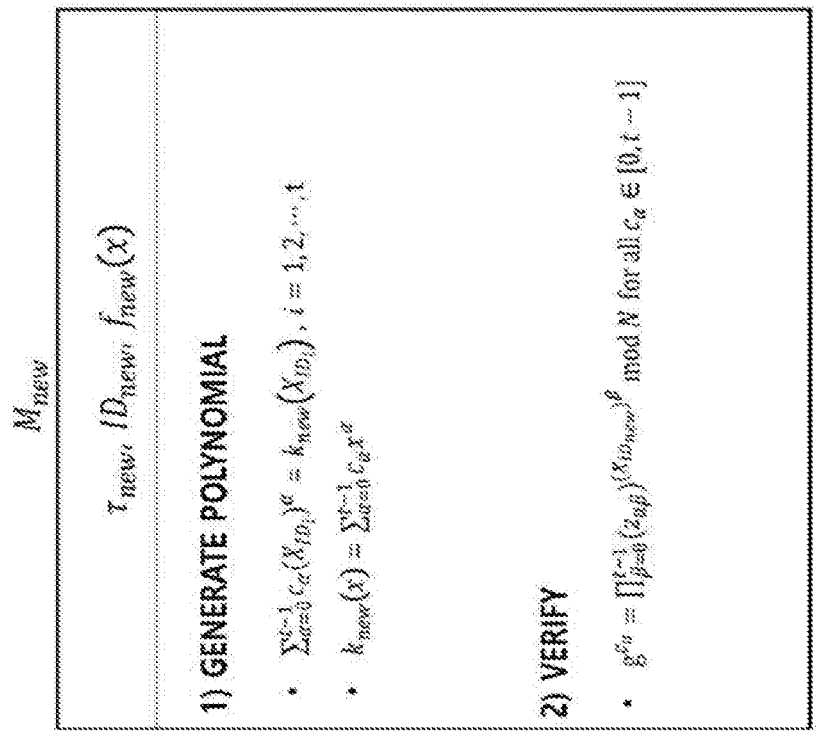
FIG. 6

FIG. 15

| PARAMETER | DESCRIPTION |
|---|---|
| $n$ | RSA MODULAR CL SIGNATURE |
| $p, q$ | PRIME FACTOR OF $n$ |
| $QR_n$ | SECONDARY SURPLUS GROUP OF MODULAR $n$ |
| $pk_B, sk_B$ | PUBLIC KEY AND SECRET KEY (PRIVATE KEY) OF ENTITY B |
| $S, Z, R_i$ | ISSUER'S PUBLIC KEY DOMAIN FOR CL SIGNATURE |
| $\Gamma$ | MODULAR OF COMMITMENT GROUP |
| $\rho$ | PRIME ORDER OF LARGE SUBGROUP OF $Z^*_\Gamma$ |
| $b$ | COMMON FACTOR OF $\Gamma - 1$ |
| $g, h$ | GENERATOR OF $Z^*_\Gamma$ HAVING ORDER $\rho$ |
| $l$ | TOTAL NUMBER OF ATTRIBUTES IN CREDENTIAL |
| $m_S$ | MASTER SECRET |
| $A$ | SET OF ARRANGED ATTRIBUTES |
| $(m_1, ... m_l)$ | ATTRIBUTES IN A |
| $A_k$ | INDICES OF ATTRIBUTES PUBLICIZED WHEN CREDENTIAL IS ISSUED |
| $A_h$ | INDICES OF ATTRIBUTES NOT PUBLICIZED WHEN CREDENTIAL IS ISSUED OR COMMITTED ATTRIBUTES |
| $A_r$ | INDICES OF ATTRIBUTES EXPOSED DURING PROVING |
| $c_i$ | COMMITMENT OF ATTRIBUTE $i$ |
| $n, g, y_1, y_2, y_3$ $n, x_1, x_2, x_3$ $h$ | VERIFIABLE ENCRYPTION PUBLIC KEY<br>VERIFIABLE ENCRYPTION PRIVATE KEY<br>VERIFIABLE ENCRYPTION PARAMETER $h = (1+n \bmod n^2) \in Z^*_{n^2}$ |

FIG. 16

| PARAMETER | DESCRIPTION | BIT LENGTH |
|---|---|---|
| $\ell_n$ | RSA MODULAR SIZE | 2048 |
| $\ell_\Gamma$ | COMMITMENT GROUP MODULAR SIZE | 1632 |
| $\ell_\rho$ | SIZE OF PARTIAL GROUP PRIME ORDER OF $\Gamma$ | 256 |
| $\ell_m$ | ATTRIBUTE SIZE | 256 |
| $\ell_{res}$ | NUMBER OF ATTRIBUTES RESERVED IN CREDENTIAL | 1 |
| $\ell_e$ | SIZE OF e VALUE OF CREDENTIAL | 597 |
| $\ell_{e'}$ | INTERVAL SIZE FOR OBTAINING e VALUE | 120 |
| $\ell_v$ | SIZE OF v VALUE OF CREDENTIAL | 2724 |
| $\ell_\emptyset$ | SECURITY PARAMETER FOR MANAGING STATISTICAL ZERO-KNOWLEDGE ATTRIBUTE | 80 |
| $\ell_k$ | SECURITY PARAMETER | 160 |
| $\ell_H$ | DOMAIN OF HASH FUNCTION H USED FOR FIAT-SHAMIR HEURISTIC | 256 |
| $\ell_r$ | SECURITY PARAMETER REQUIRED FOR SECURITY PROOF IN CREDENTIAL SYSTEM | 80 |
| $\ell_{pt}$ | PRIME NUMBER GENERATION RETURNS COMPOSITE NUMBER WITH PROBABILITY OF $1-1/2^{\ell_{pt}}$ | 80 |
| $\ell_{enc}$ | SECURITY PARAMETER USED FOR CS ENCRYPTION SCHEME | 1500 |

DECENTRALIZED GROUP SIGNATURE SCHEME FOR CREDENTIAL SYSTEMS WITH ISSUER ANONYMIZATION

CROSS-REFERENCE TO RELATED APPLICATION

This application claims priority to and the benefit of Korean Patent Application No. 10-2019-0139894, filed on Nov. 5, 2019, the disclosure of which is incorporated herein by reference in its entirety.

BACKGROUND

1. Field of the Invention

The present invention relates to a decentralized group signature scheme for credential systems with issuer anonymization.

2. Description of Related Art

Group signature schemes are widely adopted to systems requiring anonymization of group members who have signed messages. A group signature scheme often mandates a group manager who is entirely trusted by all group members; the group manager establishes keys, adds new members, and reveals a signer by removing anonymity of a signature if necessary.

Group signature schemes have been improved to decentralize the empowerment of the group manager so that the group can be instead managed by consensus of the group members. For example, the (t, n)-threshold attribute, requiring at least t consenting members out of the total of n members, can be established as the rule of the consensus in adding a new member or removing the anonymity of a signature.

On the other hand, a digital credential system is devised as a centralized platform in providing services regarding verification of various matters such as individual personal identifications, academic degree and employment proof. In particular, anonymous credential systems have been vigorously researched for personal privacy protection and credential safety. Most widely known such systems are Identity Mixer (IdeMix) by IBM and U-Prove by Microsoft.

An anonymous credential system may hide or process partial information about a credential to allow the credential to be used as a proof and may give a pseudonym to an identity owner to prevent the identity owner from being identified by an identification issuer and a verifier.

The anonymous credential systems often facilitate the selective disclosure feature which enables the identity owner to prove only a subset of attributes in a credential. However, the identity owner cannot hide the identity of the credential issuer since the credential verifier should depend on the validity of the issuer's identity.

However, inadvertent identification of the issuer may cause a privacy breach in some cases. Consider a blind recruitment scenario where the applicants need to prove their qualification for a position without revealing their personal identity or the name of university they have attended. Normally, an applicant who is an alumnus of a certain university submits a graduate certificate or original transcript digitally signed by the university to prove their academic degree or GPA. The verifier, the recruiting company, verifies the digital signature of the submitted document given the validity of the issuer's identity; the recruiting company will identify the university to which the applicant has attended.

To solve this inadvertent identification problem, issuers may group a consortium and issue signed certificates anonymously (among the consortium members). The verifiers verify the content of signed credentials based on the trust of the consortium as a whole. In the scenario, universities may form a nation-wide university credential consortium and issue their credentials using the unidentifiable signature key of the consortium.

One may utilize a group signature scheme in such a credential consortium. However, group signature schemes mandate a group manager who has the sole discretion of member addition or revocation. Hence, a decentralized group signature scheme can benefit such consortium-based credential systems by distributing the empowerment of the group manager.

SUMMARY OF THE INVENTION

The present invention is directed to providing a decentralized group signature method which is used in a credential system to ensure anonymity of an issuer by distributing exclusive authority of a group manager (representative) to group members.

According to an aspect of the present invention, there is provided a decentralized group signature method, the method including (a) an initial system setup operation of defining elements of a group signature method and information which is generated and shared by each group member, (b) an initial group member setup operation, (c) a group member participation operation of adding a new group member to a group, (d) a group signature operation of putting a group signature on a specific message, (e) an operation of verifying the group signature, (f) an operation of removing anonymity from a group signature for a specific group member with agreement of group members, and (g) an operation of expelling a specific group member with agreement of the group members. Exclusive authority of a group manager is distributed to the group members.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 2 to 4 illustrate an initial group member setup operation according to the exemplary embodiment of the present invention;

FIGS. 5 and 6 illustrate a group member participation operation according to the exemplary embodiment of the present invention;

FIG. 15 is a table showing parameters related to the anonymous authentication system according to the exemplary embodiment of the present invention;

FIG. 16 is a table showing parameter sizes related to the anonymous authentication system according to the exemplary embodiment of the present invention.

DETAILED DESCRIPTION OF EXEMPLARY EMBODIMENTS

Figure 1:
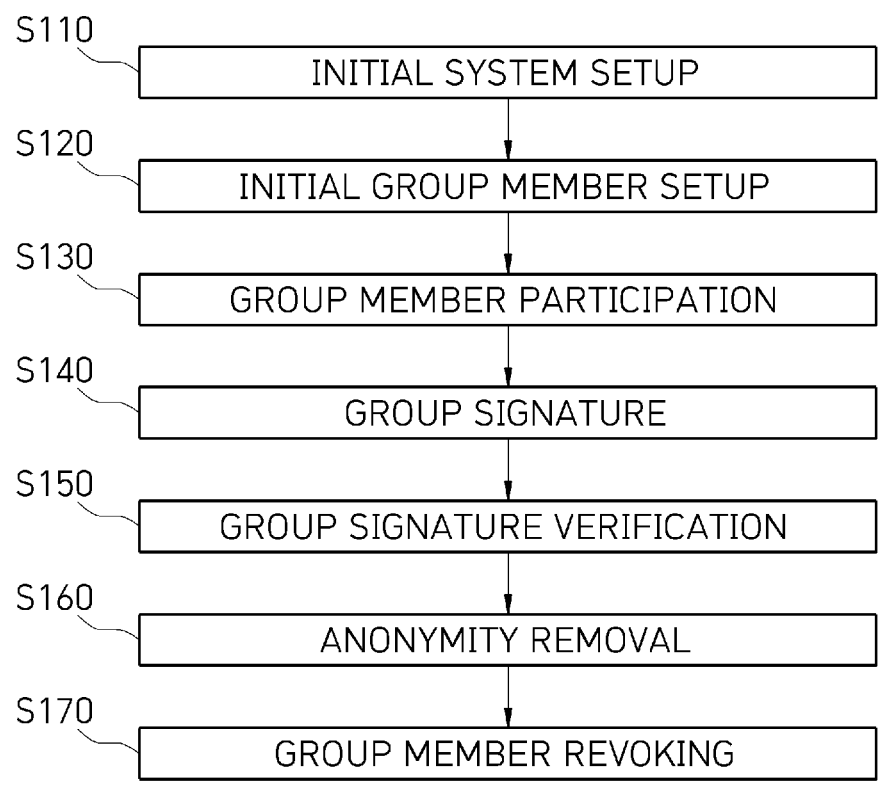
FIG. 1 is a flowchart illustrating a decentralized group signature method for an issuer-anonymized credential system according to an exemplary embodiment of the present invention.

The aforementioned object, other objects, advantages, and features of the present invention and methods for achieving them will be made clear from exemplary embodiments described below in detail with reference to the accompanying drawings.

However, the present invention is not limited to the exemplary embodiments disclosed below and can be embodied in various different forms. The embodiments are provided so that this disclosure of the present invention may be thorough and complete and may fully convey the scope of the invention to those of ordinary skill in the art. The present invention is defined by the claims.

Meanwhile, terminology used in this specification is for the purpose of describing the embodiments and is not intended to limit the present invention. In this specification, the singular forms include the plural forms as well unless the context clearly indicates otherwise. The terms "comprise" and/or "comprising" when used, herein do not preclude the presence or addition of one or more elements, steps, operations, and/or devices other than stated elements, steps, operations, and/or devices.

According to an exemplary embodiment of the present invention, in all processes, including an initial process for group members, such as, key generation, a process of adding a new member or revoking a member, a process of removing anonymity of a signature, etc., it is possible to put a group signature with agreement of members without a reliable group representative. A decentralized group signature method according to the exemplary embodiment of the present invention has high utility in identification systems.

Hereinafter, the decentralized group signature method and an exemplary embodiment of applying the decentralized group signature method to a credential system will be described.

The decentralized group signature method according to the exemplary embodiments of the present invention will be described below.

The decentralized group signature method according to the exemplary embodiments of the present invention includes an initial system setup operation S110, an initial group member setup operation S120, a group member participation operation S130, a group signature operation S140, a group signature verification, operation S150, a group member anonymity removal operation S160, and a group member revoking operation S170.

In the initial system setup operation S110, elements of a group signature scheme and information which is generated in common by members in advance or generated and shared by the members in advance are defined.

The initial group member setup operation S120 indicates a process performed in advance by each group member for group signature, signature verification, participation, revoking, and the like after the initial system setup operation.

The group member participation operation S130 indicates a method performed when a new group member is added.

The group signature operation S140 indicates a method of putting a group signature on a specific message.

The group signature verification operation S150 indicates a method of verifying the group signature.

The group member anonymity removal operation S160 indicates a method of removing anonymity from a group signature for a specific group member with agreement of group members.

The group member revoking operation S170 indicates a method of revoking a specific group member with agreement of group members.

The initial system setup operation will be described below.

The group signature method according to the exemplary embodiment of the present invention is defined by the following settings, and values that group members know in common in an initial stage are assumed to be shared among the group members through an out-of-band path deviating from the range of the present invention.

n group members participate in group signature, and each group member $M_i$ has a public key pair $(\tau_i, y_i)$.

All the group members $M_i$ are assumed to know the following in common so as to form a group in the initial stage.

n: the number of initial group members t: a quorum required for agreement $y_j$: a public key of all the group members $M_{j \neq i}$ N: a composite number $N = p_1 p_2 = (2qp'_1+1)(2qp'_2+1)$ ($p_1$, $p_2$, $p'_1$, $p'_2$, q are all prime numbers)

g: a generator having a cyclic group q (i.e., $g_q = 1 \mod N$)

$E_k\{\ \}$, $D_k\{\ \}$: a symmetric key encryption algorithm and a symmetric key decryption algorithm (k is a symmetric key)

$S_{sk}\{\ \}$, $V_{pk}\{\ \}$: a signature algorithm and a signature verification algorithm ((sk, pk) is a public key pair)

H$\{\ \}$: a hash function

COMM$\{\ \}$: a commitment generation function

To form a group in the initial stage, all the group members $M_i$ generate the following private and public values, and the public values are shared with one another.

Figure 2:
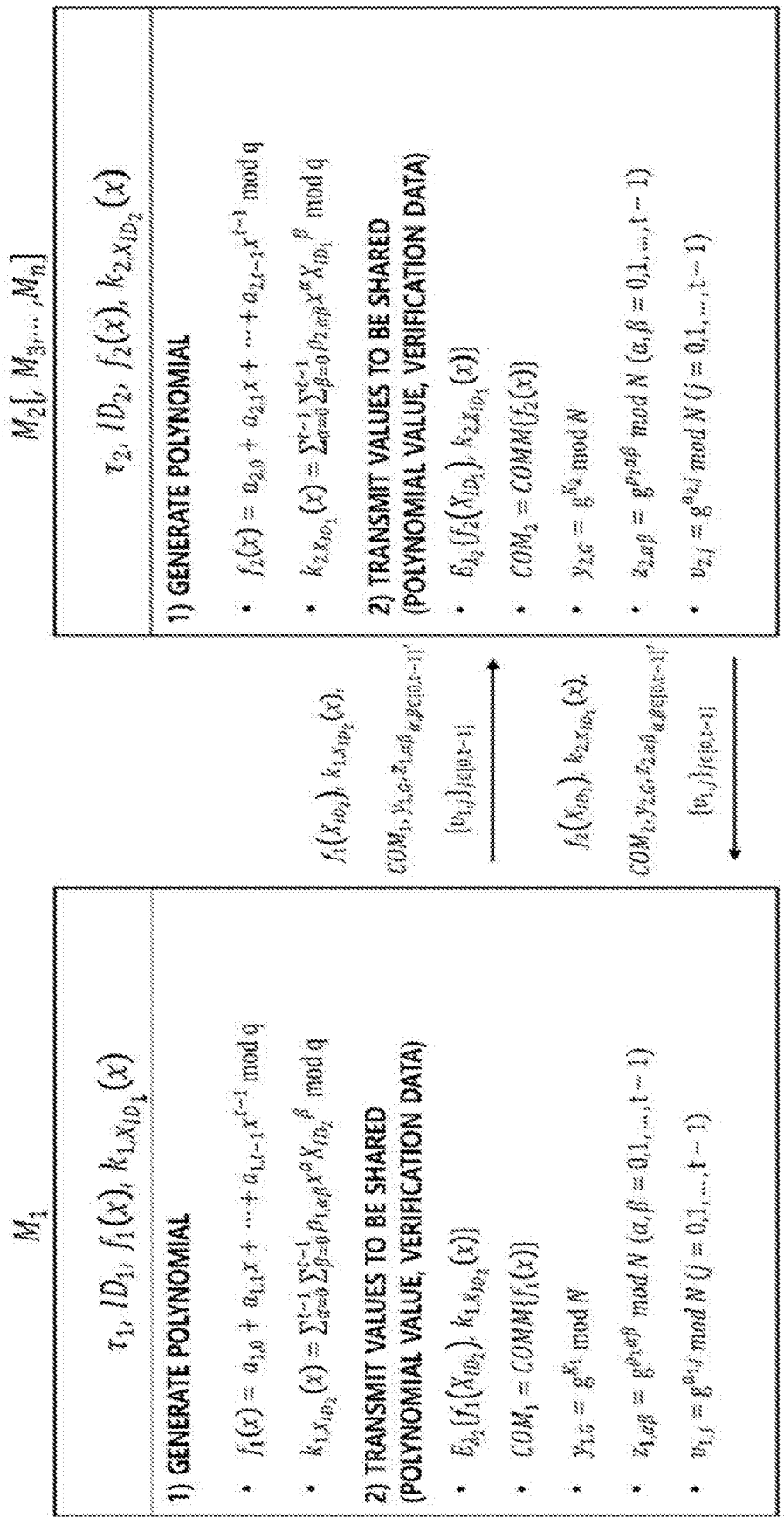
Figure 4:
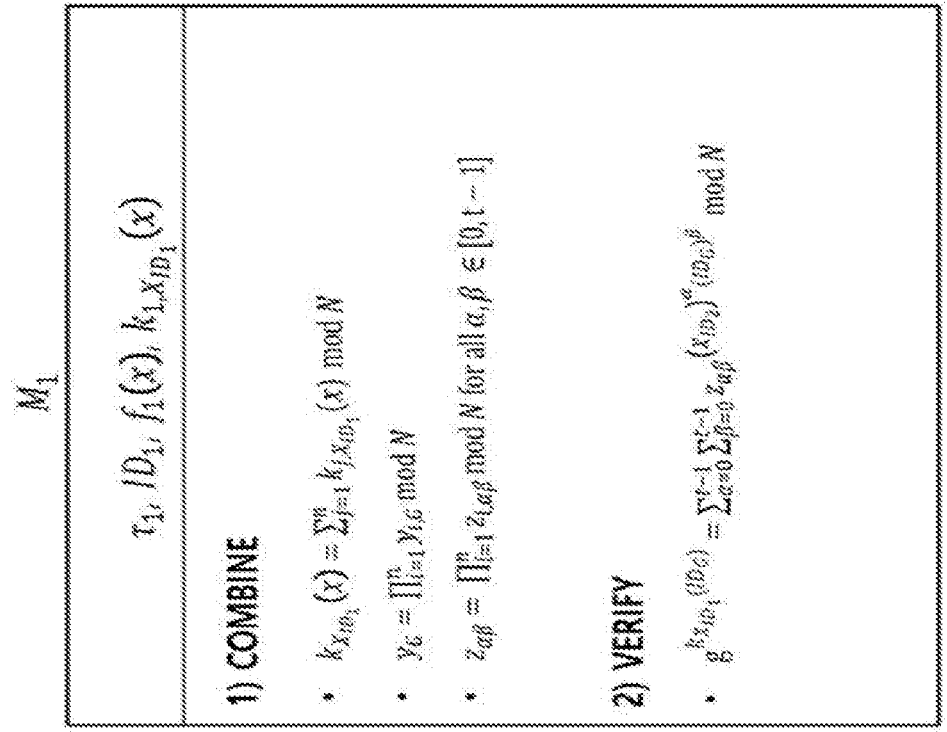

Public key pair $(\tau_i, y_i)$—an arbitrary private key $\tau_i$, and a public key $y_i = g^{\tau_i} \mod N$ Identifier pair $(ID_i, X_{ID_i})$—an arbitrary private identifier $ID_i$ and a public identifier $X_{ID_i} = g^{ID_i} \mod N$ The initial group member setup operation will be described below with reference to FIGS. 2 to 4.

The initial group member setup operation according to the exemplary embodiment of the present invention is an initial setup process in which each group member generates and combines polynomials for group signature, signature verification, participation, revoking, anonymity removal, and the like. The initial group member setup operation includes an operation of generating a polynomial of each group member, an operation of sharing polynomial verification data of each group member, an operation of sharing a polynomial value of each group member, an operation of combining polynomial and verification data of each group member, and an operation of verifying the combined polynomial.

Public parameters are $X_{ID_1}$, $X_{ID_2}$, $y_1$, $y_2$, $COM_1$, $COM_2$, $y_{1,G}$, $y_{2,G}$, $z_{1,\alpha\beta_{\alpha,\beta\in[0,t-1]}}$, $z_{2,\alpha\beta_{\alpha,\beta\in[0,t-1]}}$, $\{v_{1,j}\}_{j\in[0,t-1]}$, and $\{v_{2,j}\}_{j\in[0,t-1]}$.

In the operation generating a polynomial of each group member, a polynomial used for anonymity removal is generated according to Expression 1, and a polynomial used for signing is generated according to Expression 2.

$$f_i(x) = a_{i,0} + a_{i,1}x + \ldots + a_{i,t-1}x^{t-1} \bmod q \quad \text{[Expression 1]}$$

$a_{i,0} = ID_i$, and other coefficients ($a_{i,1}, \ldots, a_{i,t-1}$) are randomly extracted.

$$f_i(x, y) = \sum_{\alpha=0}^{t-1}\sum_{\beta=0}^{t-1} \rho_i \alpha \beta x^\alpha y^\beta \bmod q = k_{i,X_{ID_i}}(x) \quad \text{[Expression 2]}$$

$\rho_i = K_i$ and is used later for verification.

In the operation of sharing polynomial verification data of each group member, a polynomial commitment value is generated according to Expression 3, a public parameter is generated according to Expression 4, and the public parameter is shared according to Expression 5.

$$COM_i = COMM\{f_i(x)\} \quad \text{[Expression 3]}$$

Expression 3 generates a polynomial commitment value for checking integrity of a polynomial later.

group public key portion: $y_{i,G} = g^{K_i} \bmod N$ [Expression 4]

for signature-related polynomial verification:

$z_{i,\alpha\beta}, z_{i,\alpha\beta} = g^{\rho_{i,\alpha\beta}} \bmod N$ for all $\rho_{i,\alpha\beta} \in [0,t-1]$ for anonymity-removal polynomial verification:

$v_{i,j}, v_{i,j} = g^{\alpha_{i,j}} \bmod N (j=0,1,\ldots,t-1), a_{i,j}$ is a coefficient of $f_i(x)$ Since a reliable organization is distributed, each group member generates a public parameter.

$COM_i, y_{i,G}, z_{i,\alpha\beta}, v_{i,j} \rightarrow ALL$ [Expression 5]

As mentioned above, since a reliable organization is distributed, each group member shares the public parameter thereof according to the exemplary embodiment of the present invention.

In the operation of sharing polynomial verification data of each group member, a result value is generated by inputting $X_{ID_j}$ to the polynomial, which is generated by each group member, according to Expression 6 and transmitted, and each group member verifies received values according to Expression 7.

$$E_{\lambda_j}\left\{f_i(X_{ID_j}), k_{i,X_{ID_j}}(x)\right\} \rightarrow M_{j\in\{1,\ldots,n\}\setminus i} \quad \text{[Expression 6]}$$

Expression 6 calculates a polynomial value with respect to the blind identifier of a group member.

$$g^{f_i(X_{ID_j})} = \prod_{k=0}^{t-1}(v_{i,k})^{X_{ID_j}^k} \quad \text{[Expression 7]}$$

mod N (and stored to open the identifier of $M_i$)

$$g^{k_{i,X_{ID_j}}(ID_G)} = \sum_{\alpha=0}^{t-1}\sum_{\beta=0}^{t-1} z_{i,\alpha\beta}^{(X_{ID_i})^\alpha (ID_G)^\beta}$$

mod N, $ID_G$ is the public identifier of the group

Since a reliable organization is distributed, a polynomial value is received from each group member and verified.

In the operation of combining polynomial and verification data of each group member, each group member combines received values according to Expression 8 to generate a common group parameter.

$$k_i(x) = \sum_{j=1}^{n} k_{j,X_{ID_i}}(x) \bmod N \quad \text{[Expression 8]}$$

$$y_G = \prod_{i=1}^{n} y_{i,G} \bmod N$$

$z_{\alpha\beta} = \Pi_{i=1}^n z_{i,\alpha\beta} \bmod N$ for all $i, \alpha\beta \in [0,t-1]$ In the operation verifying the combined polynomial, the combined value of each member is verified according to Expression 9.

$$g^{k_i(ID_G)} = \sum_{\alpha=0}^{t-1}\sum_{\beta=0}^{t-1} z_{\alpha\beta}^{(X_{ID_i})^\alpha (ID_G)^\beta} \bmod N \quad \text{[Expression 9]}$$

Figure 5:
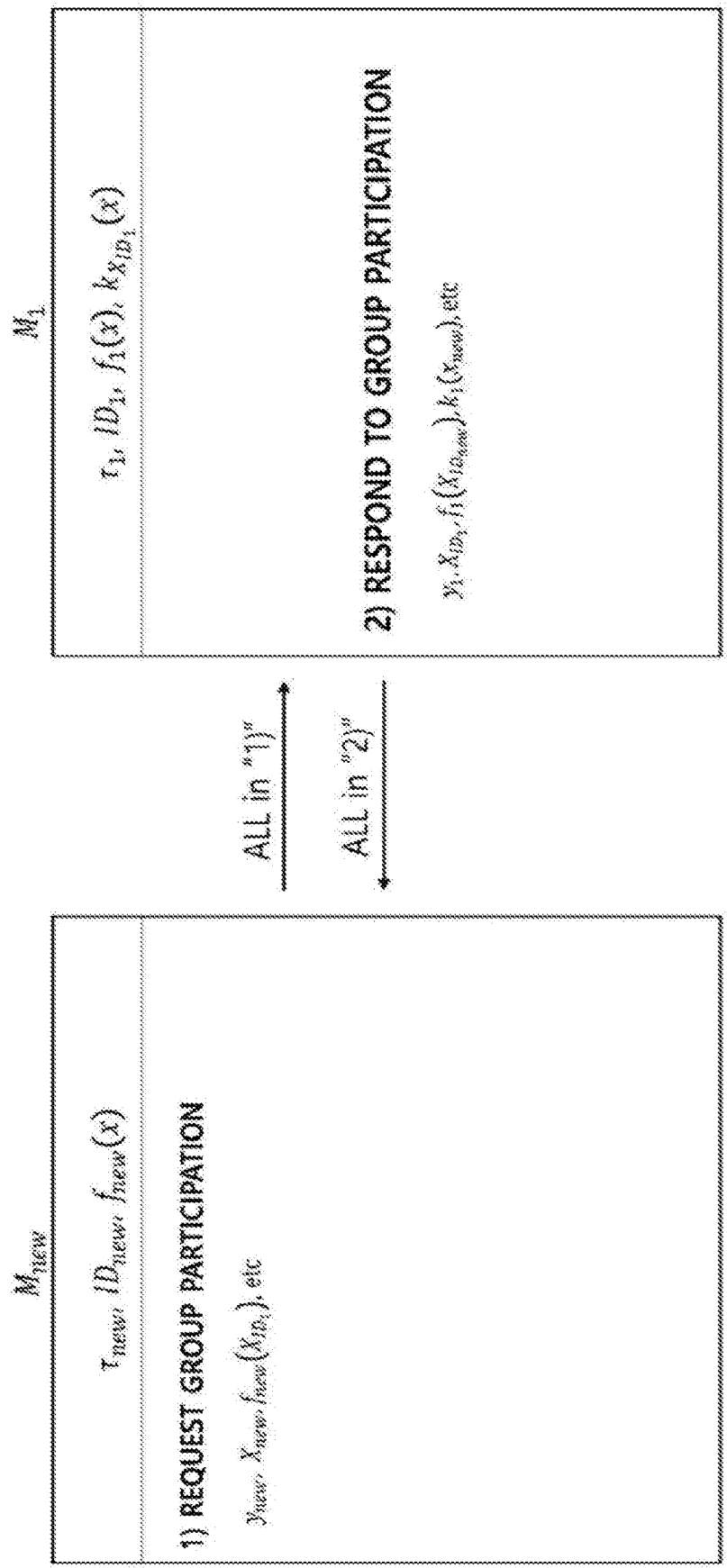

The group member participation operation will be described below with reference to FIGS. 5 and 6.

The group member participation operation according to the exemplary embodiment of the present invention is a process in which a new group member shares data with each group member and generates and verifies a polynomial to participate in the group. The group member participation operation includes an operation of sharing data of each group member for participation of a new group member, an operation of generating a polynomial of the new group member, and an operation of verifying the polynomial of the new group member.

Public and shared parameters are $y_{new}$, $X_{ID_{new}}$, $y_i$, and $X_{ID_i}$.

In the operation of sharing data of each group member for participation of a new group member, the new group member requests participation in the group according to Expression 10, and responses are made by existing group members according to Expression 11.

$M_{new}: \tau_{new}, y_{new} := g^{\tau_{new}, ID_{new}}, X_{ID_{new}} := g^{ID_{new}}$ $M_{new} \rightarrow M_i: y_{new}, X_{ID_{new}}, f_{new}(X_{ID_i})$, etc. [Expression 10]

$X_{ID_{new}} := g^{ID_{new}}$ is a group member identifier for interoperation with an anonymous authentication system.

$M_i: \tau_i, y_i := g^{\tau_i, ID_i}, X_{ID_i} \cdot g^{ID_i}$ $M_{new} \leftarrow M_i: y_i, X_{ID_i}, f_i(X_{ID_{new}}), E_{\lambda_i}\{k_i(x_{new})\}$, etc. [Expression 11]

$X_{ID_i} := g^{ID_i}$ is a group member identifier for interoperation with the anonymous authentication system.

In the operation of generating a polynomial of the new group member, when the new group member receives responses from t or more group members, the new group member generates a polynomial to be used by himself or herself as a group member according to Expression 12 and calculates $c_0, \ldots, c_{t-1}$ by solving simultaneous equations.

$$\sum_{\alpha=0}^{t-1} c_\alpha (X_{ID_i})^\alpha = k_{new}(X_{ID_i}), \; i = 1, 2, \ldots, t \quad \text{[Expression 12]}$$

$$k_{new}(x) = \sum_{\alpha=0}^{t-1} c_\alpha x^\alpha$$

In the operation of verifying the polynomial of the new group member, the new group member verifies the polynomial generated by himself or herself according to Expression 13 and specifies a group member who has given a wrong value according to Expression 14 when the verification fails.

$$g^{c_\alpha} = \prod_{\beta=0}^{t-1} (z_{\alpha\beta})^{(X_{ID_{new}})^\beta} \text{mod} N \; \text{for all} \quad \text{[Expression 13]}$$

$$c_a \in [0, t-1]$$

$$g^{k_i(X_{ID_{new}})} = \prod_{\alpha=0}^{t-1} \prod_{\beta=0}^{t-1} (z_{\alpha\beta})^{(X_{ID_{new}})^\alpha (X_{ID_i})^\beta} \text{mod} N \quad \text{[Expression 14]}$$

Figure 7:
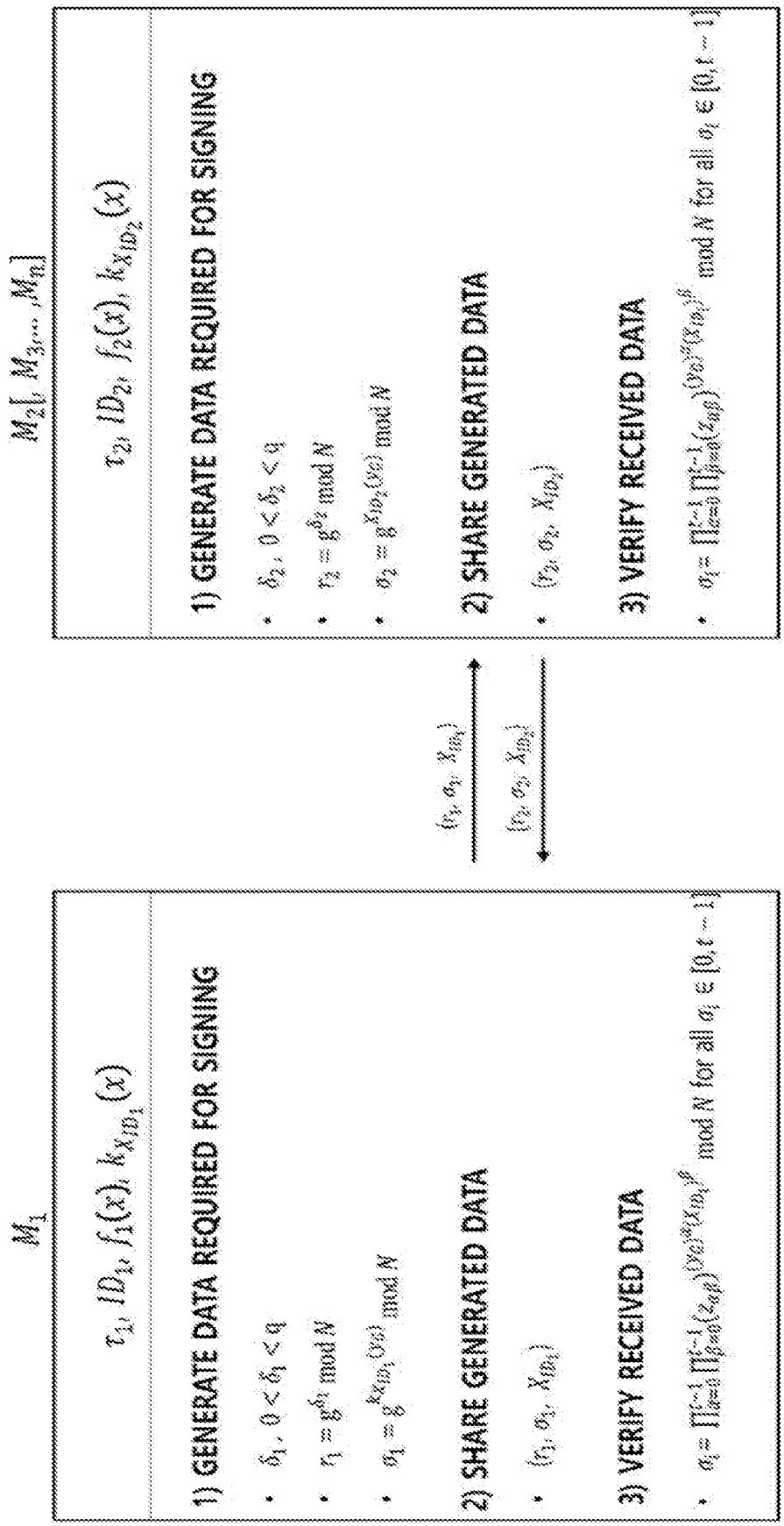
FIGS. 7 to 9 illustrate a group signature operation according to the exemplary embodiment of the present invention.
Figure 8:
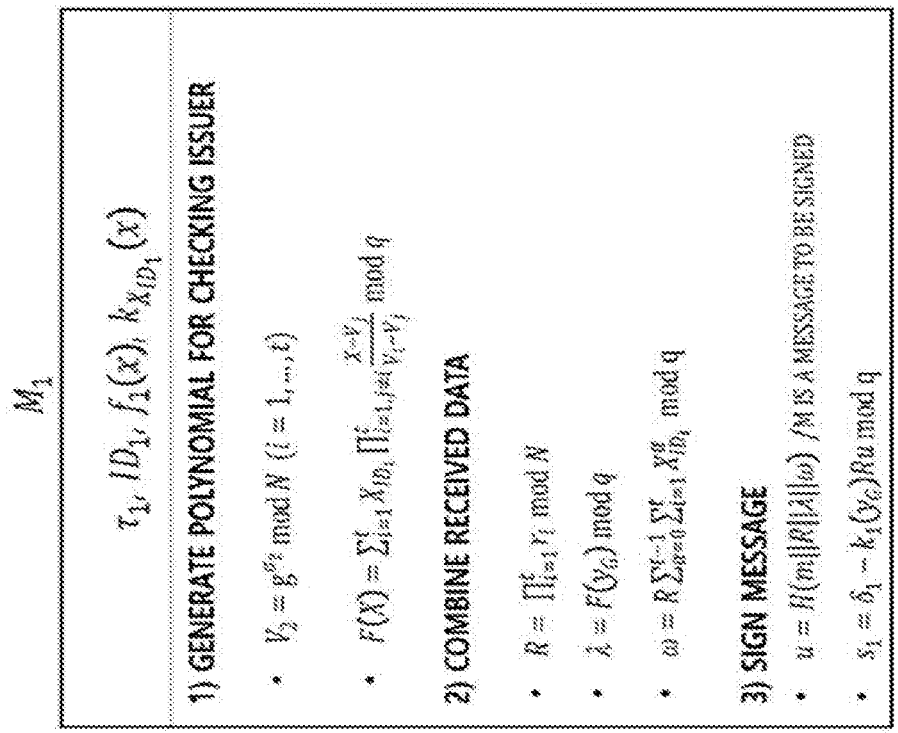
Figure 9:
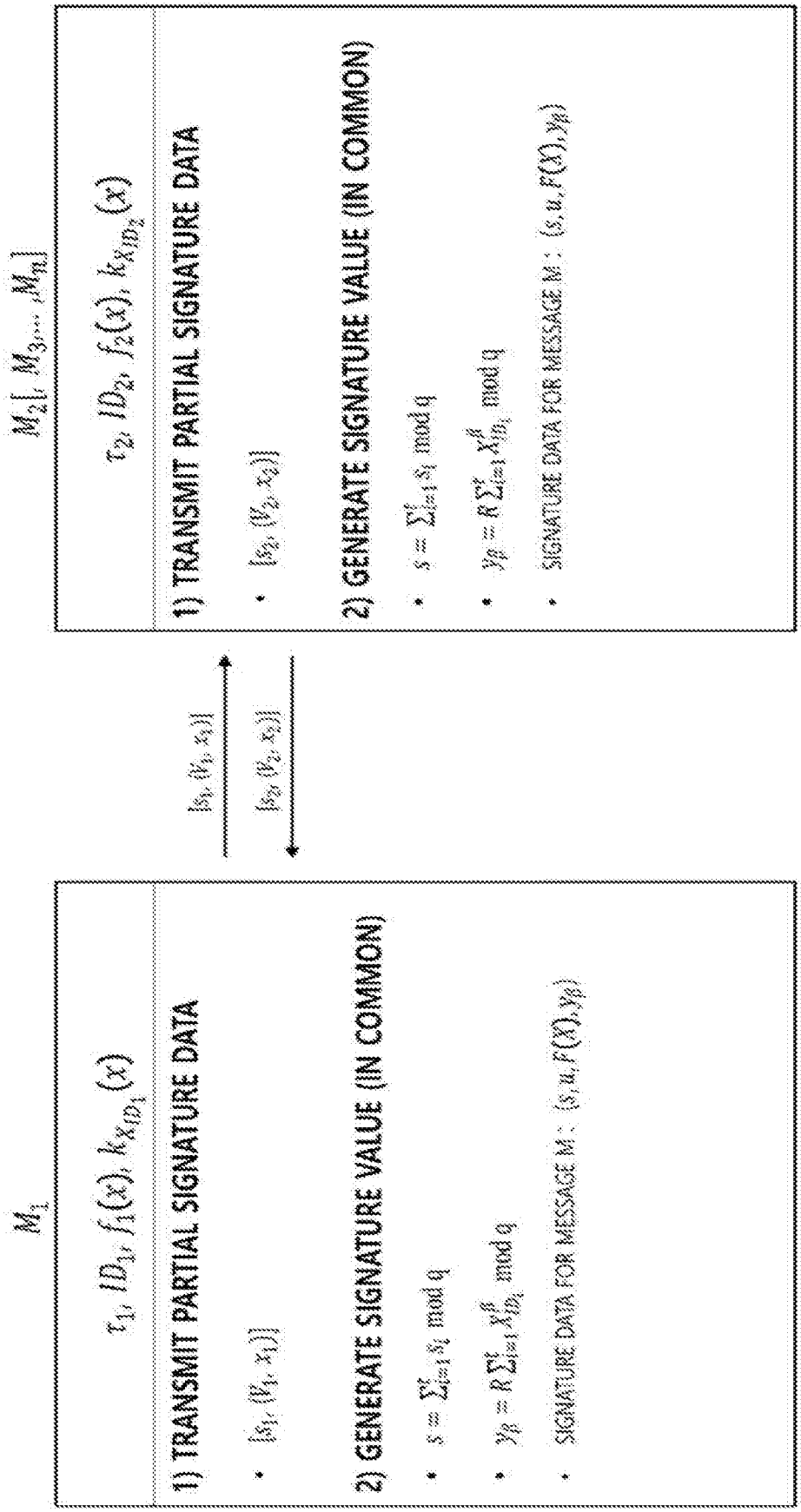

The group signature operation of putting a group signature on a specific message will be described below with reference to FIGS. 7 to 9.

The group signature operation includes an operation of generating individual data required for signing, an operation of verifying received individual data, an operation of generating a polynomial to be used in checking the number of members who have signed, an operation of combining the received individual data and signing a message, an operation of transmitting partial message signature data, and an operation of verifying received partial signature data and generating a signature value.

Public and shared parameters are $y_G$ and $\{X_{ID_i}\}_{i \in [0,n]}$.

In the operation of generating individual data required for signing, each group member selects, a random value according to Expression 15 generates individual signature data to constitute a signature according to Expression 16, and transmits the generated individual signature data to each group member according to Expression 17.

$$\delta_i, 0 < \delta_i < q \quad \text{[Expression 15]}$$

$$r_i = g^{\delta_i} \text{ mod } N$$

$$\sigma_i = g^{k_i(y_G)} \text{mod } N \quad \text{[Expression 16]}$$

$$(r^i, \sigma_i, X_{ID_i}) \to M_{j \in (1, \ldots, n) \setminus i} \quad \text{[Expression 17]}$$

where $X_{ID_i}$ is a group member identifier for interoperation with the anonymous authentication system.

In the operation of verifying received individual data, the received individual, data $(r_i, \sigma_i, X_{ID_i})$ is verified according to Expression 18. When the verification fails, $M_i$ is determined to have transmitted the wrong data $(r_i, \sigma_i, X_{ID_i})$.

$$\sigma_i = \prod_{\alpha=0}^{t-1} \prod_{\beta=0}^{t-1} (z_{\alpha\beta})^{(y_G)^\alpha (X_{ID_i})^\beta} \text{ mod } N \quad \text{[Expression 18]}$$

for $\sigma_i \in [0, t-1]$

In the operation of generating a polynomial to be used in checking the number of signed members, a polynomial to be used in checking the number of signed members is generated according to Expression 19.

$$V_i = g^{\sigma_i} \text{mod} N (i = 1, \ldots, t) \quad \text{[Expression 19]}$$

$$F(X) = \sum_{i=1}^{t} X_{ID_i} \prod_{i=1, j \neq i}^{t} \frac{X - V_j}{V_i - V_j} \text{mod} q$$

In the operation of combining the received individual data and signing a message, the received individual data is combined according to Expression 20, and a message is signed according to Expression 21.

$$R = \prod_{i=1}^{t} r_i \text{mod} N \quad \text{[Expression 20]}$$

$$\lambda = F(y_G) \text{mod} q$$

$$\omega = R \sum_{\alpha=0}^{t-1} \sum_{i=1}^{t} X_{ID_i}^\alpha \text{mod} q$$

$u = H(m \| R \| \lambda \| \omega), m$ is a message to be signed $$s_i = \delta_i - k_i(y_G) Ru \text{ mod } q \quad \text{[Expression 21]}$$

In the operation of transmitting partial message signature data, message signature data is transmitted according to Expression 22.

$$[s_i, (V_i, x_i)] \to M_{j \in (1, \ldots, t) \setminus i} \quad \text{[Expression 22]}$$

In the operation of verifying received partial signature data and generating a signature value, received signature data is verified according to Expression 23, and a signature value is generated according to Expression 24.

$$F(V_i) = X_{ID_i} \quad \text{[Expression 23]}$$

$$g^{s_i} = r_i \prod_{\alpha=0}^{t-1} \prod_{\beta=0}^{t-1} (z_{\alpha\beta})^{-(y_G)^\alpha (x_i)^\beta Ru} \text{mod} N$$

for all $i = [1, t]$ $$s = \sum_{i=1}^{t} s_i \text{mod} q \quad \text{[Expression 24]}$$

$$y_\beta = R \sum_{i=1}^{t} X_{ID_i}^\beta \text{mod} q$$

signature data for the message m: $(s, u, F(X), y_\beta)$

Figure 10:
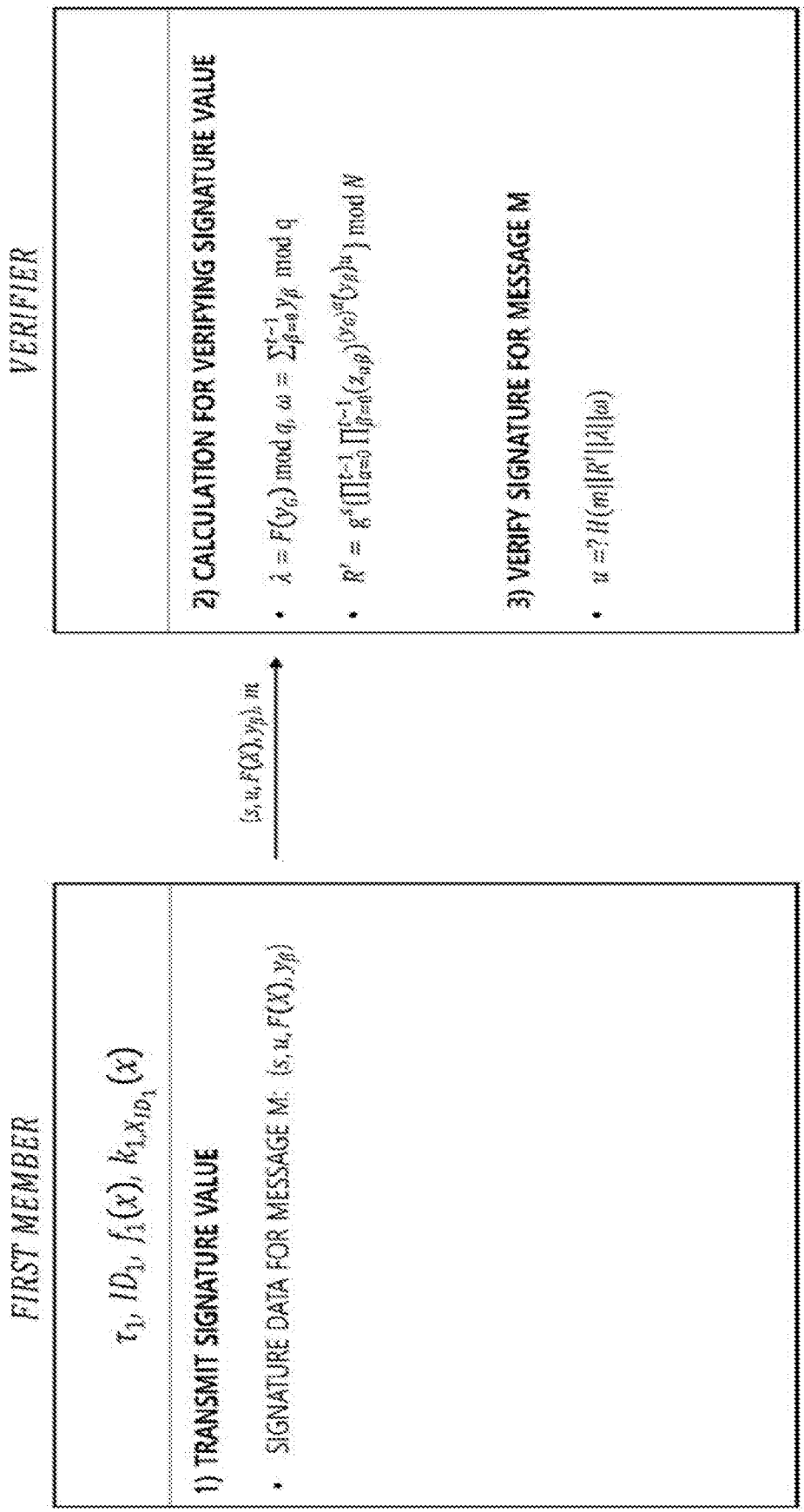
FIG. 10 illustrates a group signature verification operation according to the exemplary embodiment of the present invention.

The group signature verification operation will be described below with reference to FIG. 10.

Public parameters are $y_G$ and $z_{\alpha\beta}$.

In the group signature verification operation, calculation is performed to verify a signature value according to Expression 25, and the signature for the message m is verified according to Expression 26.

$$\lambda = F(y_G) \bmod q, \quad \omega = \sum_{\beta=0}^{t-1} y_\beta \bmod q \qquad \text{[Expression 25]}$$

$$R' = g^s \left\{ \prod_{\alpha=0}^{t-1} \prod_{\beta=0}^{t-1} (z_{\alpha\beta})^{(y_G)^\alpha (y_\beta)^u} \right\} \bmod N$$

$$u = H(m\|R'\|\lambda\|\omega) \qquad \text{[Expression 26]}$$

When the above expression holds true, the signature (s, u, F (X), $y_\beta$) is valid.

Figure 11:
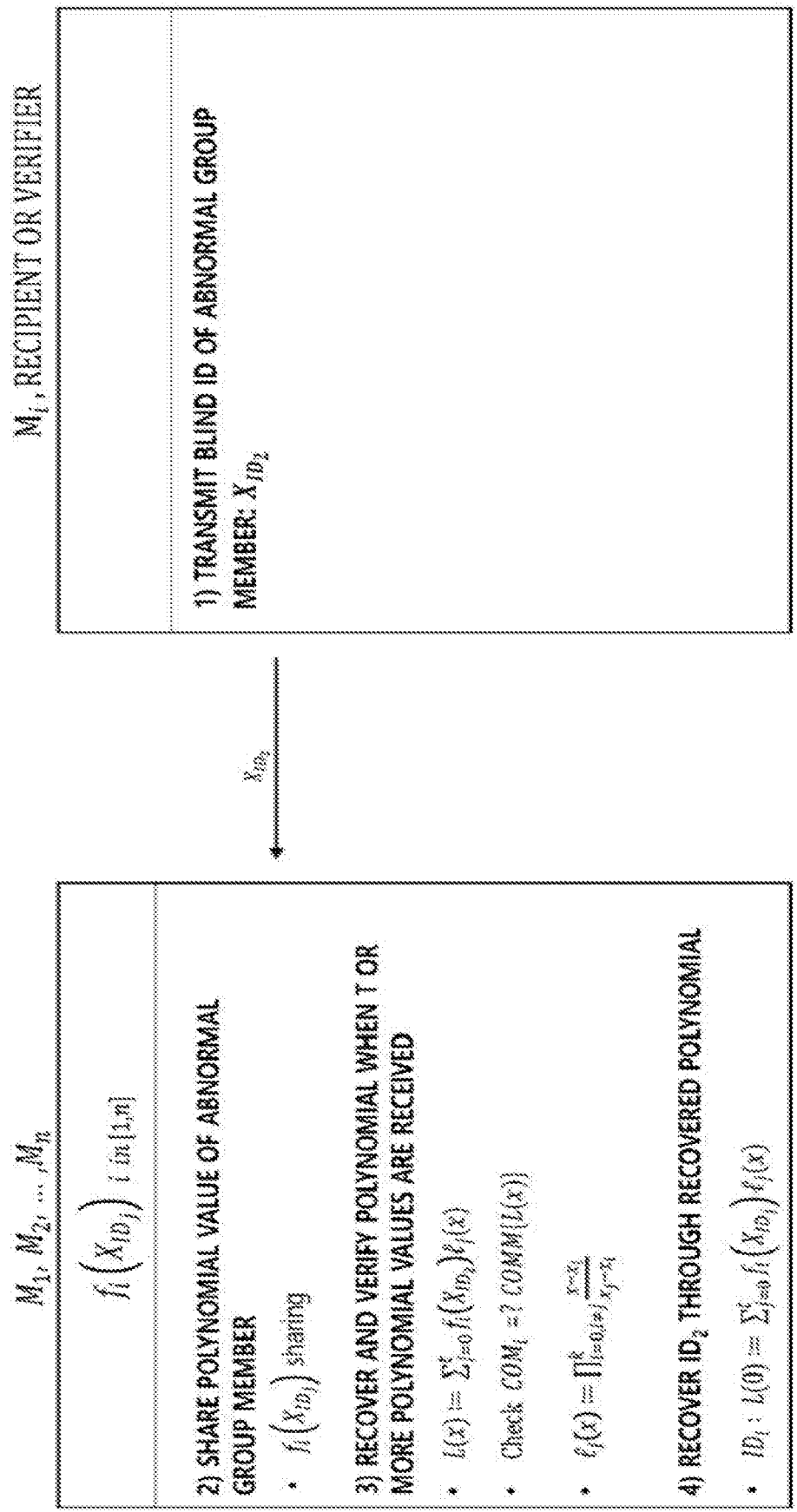
FIG. 11 illustrates a group member anonymity removal operation according to the exemplary embodiment of the present invention.

The group member anonymity removal operation will be described below with reference to FIG. 11.

The following is a process of removing anonymity of a specific group member through a quorum t of members required for agreement or more. A shared parameter is $\{X_{ID_i}\}_{i\in[0,n]}$.

In the group member anonymity removal operation, $X_{ID_i}$ of an abnormal group member is shared, and managers share $f_i(X_{ID_i})$ received from $X_{ID_i}$ with one another.

When t or more polynomial values are received, each manager recovers a polynomial from the received polynomial values and then verifies the recovered polynomial according to Expression 27.

$$L(x) := \sum_{j=0}^{t} f_i(X_{ID_j}) \ell_j(x) \qquad \text{[Expression 27]}$$

Check $COM_i = ? COMM\{L(x)\}$ $$\ell_j(x) := \prod_{i=0, i \neq j}^{k} \frac{x - x_i}{x_j - x_i}$$

According to Expression 28, the recipient identifier $ID_i$ is checked through the recovered polynomial.

$$ID_i: L(0) := \sum_{j=0}^{t} f_i(X_{ID_j}) \ell_j(x) \qquad \text{[Expression 28]}$$

Figure 12:
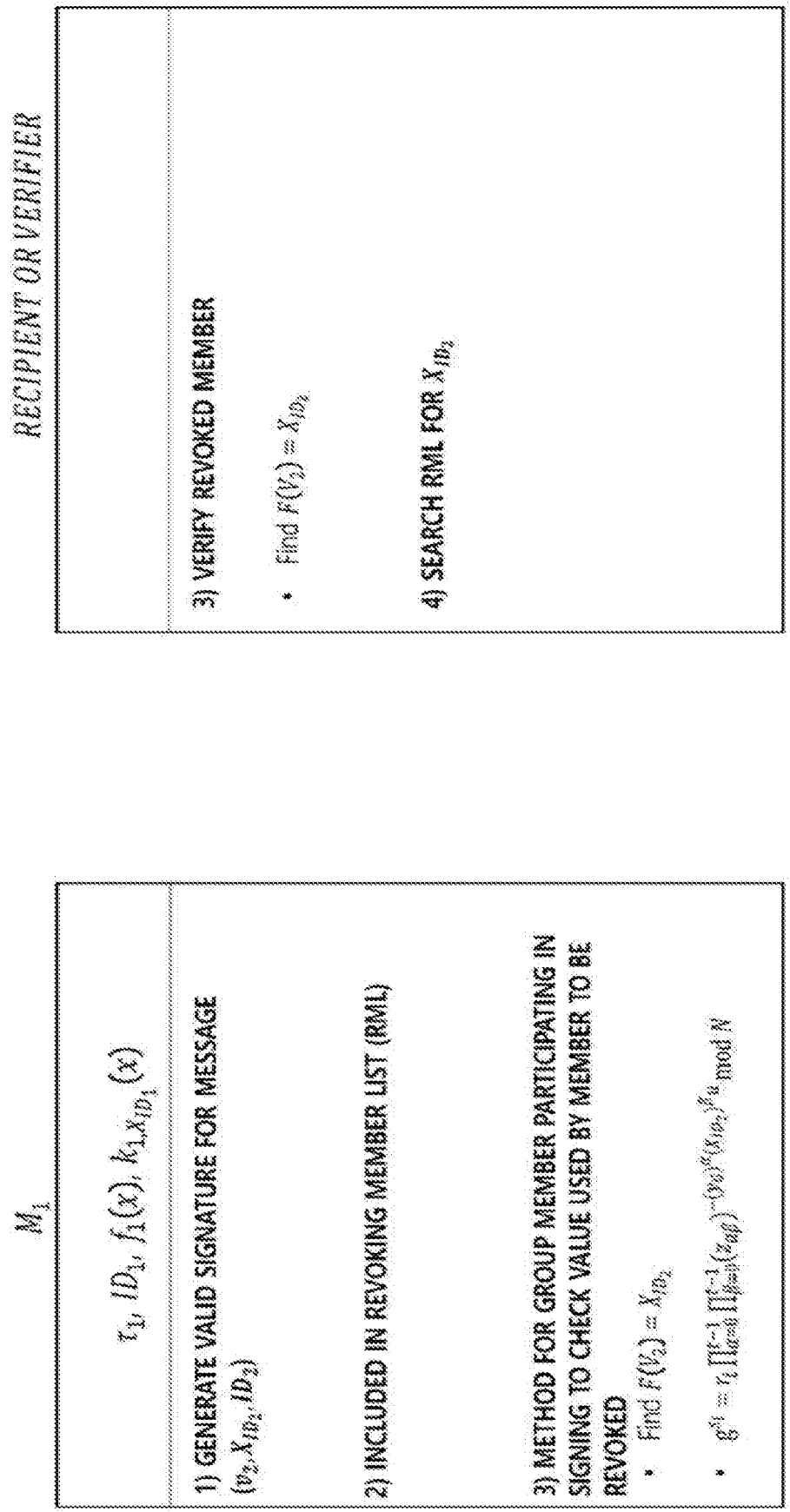
FIG. 12 illustrates a group member anonymity removal operation and a group member revoking operation according to the exemplary embodiment of the present invention.

The group member revoking operation will be described below with reference to FIG. 12.

The group member revoking operation is a process of revoking a group member disclosed through group member anonymity removal. Public parameters are $\{X_{ID_i}, V_i\}_{i\in[0,n]}$ and a revoking member list (RML).

In the group member revoking operation, t or more group members sign a revoking member list ($ID_l$ is acquired in the above-described group member anonymity removal operation) according to Expression 29, and a value used by the member to be revoked is checked by the group members who have signed the RML according to Expression 30.

signature message: $v_i \| X_{ID_i} \| ID_l$ [Expression 29]

included in RML $X_{ID_i}$ is a group member identifier for interoperation with the anonymous authentication system.

Find $F(V_l) = X_{ID_l}$ [Expression 30]

$$g^{s_i} = r_i \prod_{\alpha=0}^{t-1} \prod_{\beta=0}^{t-1} (z_{\alpha\beta})^{-(y_G)^\alpha (X_{ID_i})^\beta u} \bmod N$$

The configuration of a credential system which employs the above-described decentralized group signature method to provide issuer anonymity will be described below.

The protocol of the anonymous authentication system, which is obtained by applying the decentralized group signature method to the IdeMix protocol, will be described below. According to the exemplary embodiment of the present invention, the validity of a credential is verified by proving values with which group members blindly sign the identifier of another group member who issues the credential.

1. The outline of an anonymous authentication system application method will be described below.

The anonymous authentication system according to the exemplary embodiment of the present invention includes logic for an initial recipient to verify a group member.

An issuer transmits an $X_{ID}$ value thereof, related signature information, knowledge proof data, etc. to a recipient, and the recipient verifies the validity of the issuer by verifying the corresponding value.

According to the exemplary embodiment of the present invention, the recipient designates related information as attribute values to allow a verifier to verify the validity of the issuer later.

$m_1$: $X_{ID}$ (the blind identifier of the issuer)

$m_2$: $\mathcal{G}_s$ (a signature for the blind identifier)

$m_3$: SN (a serial number which is used later when it is necessary to identify a credential with a serial number)

$m_4$: Time (a timestamp for recording an update time point)

$m_5$: master secret key (a recipient identifier)

According to the exemplary embodiment of the present invention, the issuer verifies the message values $m_1$ to $m_4$ and issues a credential, and a verifier verifies the validity of the issuer by verifying the message values thereafter.

According to the exemplary embodiment of the present invention, valid group members serve as the issuer of the anonymous authentication system by proving values, with which the valid group members signed a blind identifier of a group member, to participants in the anonymous authentication system.

As a process to be performed before issuance of an anonymous credential, the issuer $M_i$ is required to receive valid signatures for the blind value $X_{ID_i}$ of $ID_i$ which is the identifier of the issuer n (it is possible to set a signature processing option to use $X_{ID_i}$ only once).

A pair of keys to be used in the anonymous credential system is generated.

The recipient verifies whether a group member is a valid group member and generates a knowledge proof value for an attribute which will not be disclosed, among attributes to be authenticated.

The issuer verifies attribute values received from the recipient and issues a credential for private attribute values and public attribute values.

As a task before the credential is provided to a verifier, the recipient randomizes the credential, generates proof data for the private attributes, and provides the credential, to a verifier.

The verifier checks that the credential has been generated by a valid group member, verifies the validity of the credential, and checks necessary attribute values.

The exemplary embodiment of the present invention has a technical characteristic that an, operation of verifying that a credential issuer corresponds to group members is added as a change when, group signature is adopted to ensure issuer anonymity.

As a blind identifier signature processing option according to the exemplary embodiment of the present invention, a real-time signature processing scheme (option 1) is described.

A group member participation process is performed as a preceding task, and every time a blind identifier is additionally required, a group signature process is repeated to generate a blind identifier.

In the case of issuing a credential to a recipient using a zero-knowledge proof for the blind identifier, a new blind identifier is generated for a next recipient's signature, and a group member who receives the blind identifier signs a corresponding value and transmits the corresponding value to other group members so that a valid signature may be generated according to a threshold signature policy.

When valid signature values are generated for blind identifiers by group members, a credential is issued to the recipient using the valid signature values.

As a blind identifier signature processing option according to the exemplary embodiment of the present invention, a batch signature processing scheme (option 2) is described.

A group member participation process is performed as a preceding task, and a group signature process is performed at a predetermined specific time point which is determined in advance through agreement.

In this case, a large number of blind identifiers to be used for credential issuance are generated and transferred to group members at an arbitrary time, and the group members who receive the blind identifiers sign a corresponding value and transmit the corresponding value to other group members so that a valid signature may be generated according to a threshold signature policy.

When valid signature values are generated for the blind identifiers by the group members, a credential is issued to a recipient using the valid signature values.

Figure 13:
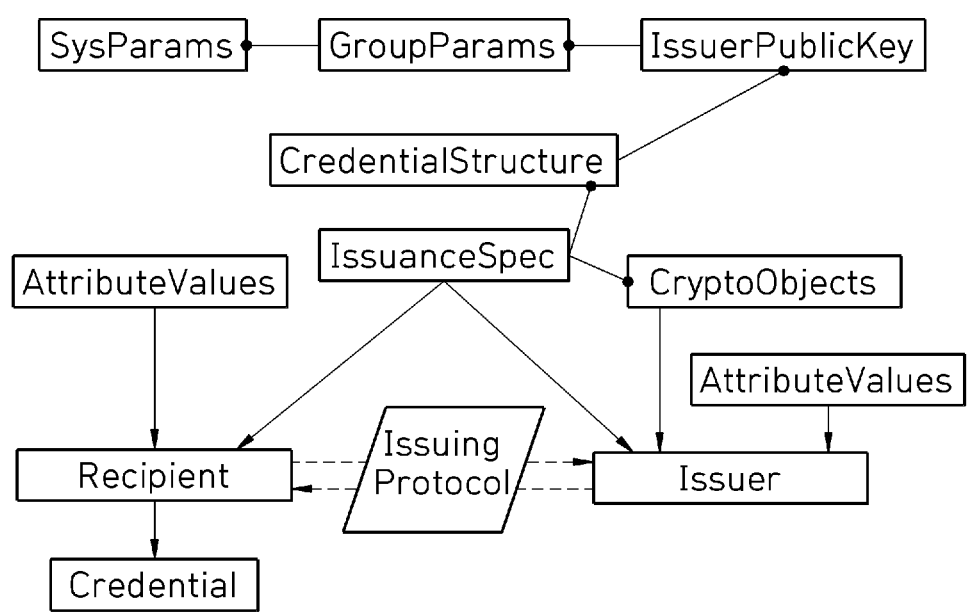
FIGS. 13 and 14 illustrate protocol flows in an anonymous authentication system according to the exemplary embodiment of the present invention.
Figure 14:
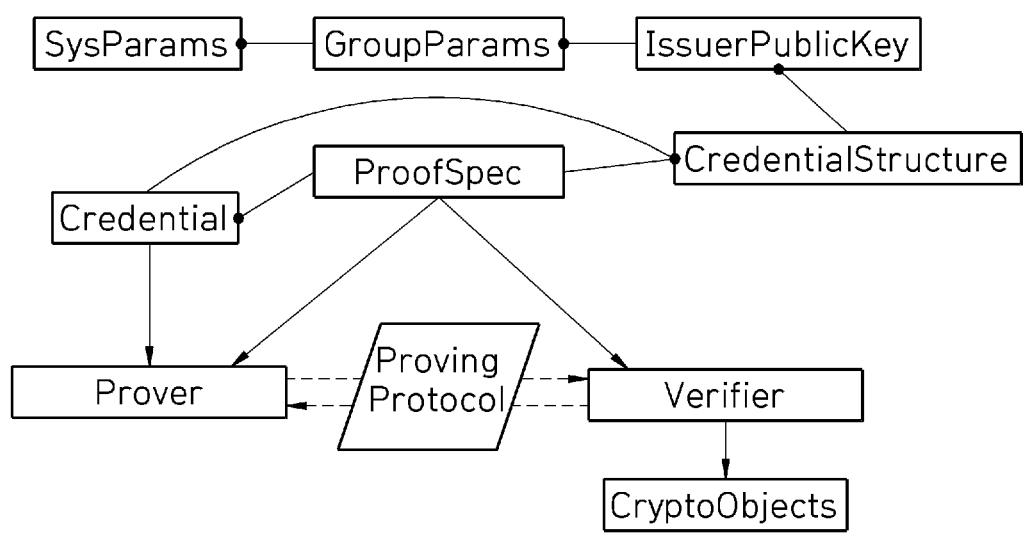

Referring to FIGS. 13 and 14, a protocol flow in the anonymous authentication system will be described.

Referring to FIG. 13, the outline of input values of participants in the issuance protocol of IdeMix is shown, and an issuer and a recipient may have different attribute values.

In particular, the issuer cannot have any knowledge about secret data, and group and system parameters can be accessed through references given to a credential struct.

Referring to FIG. 14, most input values to a proving protocol are proof specifications.

A proof specification is connected to a credential of a prover and is also connected to a credential struct of a verifier.

The verifier obtains a proof specification as a cryptographic secret output, object which may be used in an application-specific task such as an issuance protocol.

2. Notation of the anonymous authentication system application method will be described below.

Notation related to group signature is described below.
group member set (group manager as well): M
group member identifier (secret data): ID
public group identifier: $ID_G$
external group-member identifier public): $X_{\mathfrak{ID}}$
commitment value: COM
polynomial value: $f(x)$
notation related to $i^{th}$ group member: $M_i$, $ID_i$, $X_{\mathfrak{ID}}$, $COM_i$, $f_i(x)$, etc.
group signature: $\mathcal{G}_s$ Parameters related to the anonymous authentication system and the descriptions thereof are shown in FIG. 15, and the sizes of the parameters related to the anonymous authentication system are shown in FIG. 16.

In addition, Time is a timestamp, SN is a serial number, and context is a list of all public parameters and public keys of issuers.

3. A credential issuance procedure (issuer and recipient) and a credential issuance protocol of the anonymous authentication system application method will be described below.

Input commons are $\mathcal{S}$, {nym}, {dNym}, $\{C_k\}_{\forall k \in A_c}$, and $\{m_i\}_{\forall i \in A_k}$.

A recipient is $m_S$, $\{(m_k, r_k)\}_{k \in A_c}$, $\{m_j\}_{\forall j \in A_h}$, and $\{r_i\}_{\forall i \in \{nym\}}$.

An issuer is sk and group signature information.

As an output common, $\perp$ is returned when a Camenisch-Lysyanskaya (CL) signature (A, e, v) or protocol fails.

$\mathcal{S}$ is an issuance specification.

{nym} is a pseudonym, $nym \equiv g^{m_s} h^r$ (mod $\Gamma$), and $m_S$=master secret key.

{dNym} is a domain pseudonym, and $dNym \equiv g_{dom}^{m_s}$(mod $\Gamma$).

$\{C_k\}$ is a commitment, and $C_k \equiv \pm Z_{(k)}^{m_s} S_{(k)}^{r_k}$(mod $n_{(k)}$).

$\{m_j\}$ is a message.

Round 0

Round 0 is a procedure for authenticating a group member and is also an operation in which a recipient or verifier verifies that an issuer is a valid group member while issuer anonymity is ensured.

The point is to verify whether a group signature has been put on a corresponding blind identifier and zero-knowledge proof for the blind identifier of the issuer.

The verification is intended to prove that a quorum of group members agree with the blind identifier of the recipient and is intended for the issuer who actually issues a credential to check that the recipient is the owner of the blind identifier.

0.1 Recipient: $n_1 \in_R \{0,1\}^*$ 0.2 Issuer←recipient: $n_1$ 0.3 Issuer: Timestamp Time, SerialNumber $SN \in_R \{0,1\}^{\ell_m}$, c=H(Time||SN||$\mathcal{G}_s$||$g^{r_{\mathfrak{ID}_i}}$||$n_1$), and $n_2 \in_R \{0,1\}^*$ 0.4 Issuer→recipient: Time, SN, $\mathcal{G}_s$, $X_{\mathfrak{ID}_i}$, $s_{\mathfrak{ID}_i}$, c, and $n_2$ 0.5 Recipient: verifies the following:

the group signature value $\mathcal{G}_s$ with respect to $X_{\mathfrak{ID}_i}$ whether the issuer knows a discrete logarithm value of $X_{\mathfrak{ID}_i}$ ($\mathfrak{ID}_i$)

whether the issuer has generated c using values sent by the recipient 0.6 Issuer and recipient: call the attribute struct A from S Round 1

1.1 Recipient: $\in_R \{0,1\}^{\ell_n + \ell_\emptyset}$ 1.2 Recipient: $U := S^{v'} \Pi_{j \in A_h} R_j^{m_j}$ mod n ($m_1 = X_{\mathfrak{ID}_i}$, and $m_1$ is always exposed)

In $m_1 = X_{\mathfrak{ID}_i}$, the recipient inserts the blind identifier of a group member to his or her attribute so that a verifier may verify the validity of the issuer later, and the issuer verifies whether a blind identifier used by the issuer has an attribute value at the corresponding position.

1.3 Recipient: non-interactive proof 1.3.0.1 $\tilde{m}_j \in_R \{0,1\}^{\ell_m + \ell_\emptyset + \ell_H + 1}$ for $j \in \{5 \cup A_h \cup A_c\}$ 1.3.0.2 (Knowledge proof of pseudonym and master secret key) In the case of nym≠⊥, nym is set to $\tilde{r}_i \in_R [1, \rho]$, and $\widetilde{nym} := g^{\tilde{m}_s} h^{\tilde{r}_i}$ mod $\Gamma$ is calculated. Otherwise, it is set that $\widetilde{nym} = \perp$.

1.3.0.3 (Knowledge about domain pseudonym and master secret key) In the case of dNym≠⊥, $\widetilde{dNym} := g_{dom}^{\tilde{m}_s}$ mod $\tau$ is calculated. Otherwise, it is set that $\widetilde{dNym} := \perp$.

1.3.1 (Knowledge proof of representation of U')
$\tilde{v}' \in_R \pm \{0,1\}^{\ell_n + 2\ell_\emptyset + \ell_H}$ is selected, $\tilde{U} := S^{\tilde{v}'} \Pi_{j \in A_h} R_j^{\tilde{m}_i}$ mod n is calculated, and then all random values are stored 1.3.2 (Knowledge proof of commitment value)
$\tilde{r}_j \in_R \{0,1\}^{\ell_n + 2\ell_\emptyset + \ell_H}$ is selected, an $$\tilde{C}_j := \left( Z_{(j)}^{\tilde{m}_j} S_{(j)}^{\tilde{r}_j} \bmod n_{(j)} \right)_{j \in A_c}$$

is calculated 1.3.3 (Challenge value)

$$c := H(\text{context} \| U \| C_1 \| \ldots \| C_k \| \text{nym} \| d\text{Nym} \| \tilde{U} \| \tilde{C}_1 \| \ldots \| \tilde{C}_k \| \widetilde{nym} \| \widetilde{d\text{Nym}} \| n_2)$$

1.3.4 (Response value)

$$\hat{v}' := \tilde{v}' + cv'$$

$$S_A := (\hat{m}_j := \tilde{m}_j + cm_j)_{j \in A_h}$$

In the case of nym≠⊥, $(\hat{r}_j := \tilde{r}_j + cr_j \bmod \rho)_{j \in \{nym\}}$ is calculated. Otherwise, it is set that $\hat{r} := \bot$.

1.3.5 (Output)

$$P_1 := (c, \hat{v}', S_A, \hat{r})$$

1.4 Issuer←recipient: U, $P_1$, and $n_3 \in_R \pm \{0,1\}^{\ell_\emptyset}$ 1.5 The recipient stores $A_k$ (the value and the struct), v', and context in a file (used for a credential update)

Round 2 (Signature Generation)

2.1 The issuer verifies $P_1$.

2.1.0.1 (Knowledge proof of pseudonym and master secret key) In the case of nym≠⊥, nŷm:=nym$^{-c}$g$^{\hat{m}_s}$h$^{\hat{r}}$ mod Γ is calculated. Otherwise, it is set that nŷm:=⊥.

With regard to nŷm:=nym$^{-c}$g$^{\hat{m}_s}$h$^{\hat{r}}$ mod Γ, the index number of an attribute value for ensuring the anonymity of the recipient is changed due to attribute values used for verifying a group member, and a pseudonym value is set in $\hat{m}_1$ in the original scheme.

2.1.0.2 (Knowledge proof of domain pseudonym and master secret key) In the case of dnym≠⊥, d$\hat{\text{N}}$ym:=dNym$^{-c}$g$_{dom}^{\hat{m}_s}$ mod Γ is calculated.

2.1.1 (Representation of U)

$$\hat{U} := U^{-c}(S^{\hat{v}'} \Pi_{j \in A_h} R_j^{\hat{m}_j}) \bmod n$$

2.1 The issuer verifies $P_1$.

2.1.2 (Knowledge proof of commitment value) In the case of dnym≠⊥, $\hat{C}_j := (c_j^{-c} Z_{(j)}^{\hat{m}_j} S_{(j)}^{\hat{r}_j} \bmod n_{(j)})_{j \in A_c}$ is calculated.

2.1.3 (Verification)

$$\hat{c} := H(\text{context} \| U \| C_1 \| \ldots \| C_k \| \text{nym} \| d\text{Nym} \| \hat{U} \| \hat{C}_1 \| \ldots \| \hat{C}_k \| n\hat{y}m \| d\hat{N}ym \| n_2)$$

In the case of ĉ≠c, the verification fails. The credential issuance protocol is terminated, and ⊥ is returned.

2.1.4 (Length check)

$$\hat{v}' \in \pm \{,1\}^{\ell_n + 2\ell_\emptyset + \ell_H + 1},$$

$$\hat{m}_i \in \pm \{0,1\}^{\ell_n + 2\ell_\emptyset + \ell_H + 2} \text{ for all } i \in \{5 \cup A_h \cup A_c\}$$

When the length check fails, the credential issuance protocol is terminated, and ⊥ is returned.

2.2 The issuer generates a CL signature for attributes.

2.2.1 A random prime number is selected.

$$e \in_R [2^{\ell_e - 1}, 2^{\ell_e - 1} + 2^{\ell'_e - 1}]$$

2.2.2 A random integer is selected, and $\tilde{v} \in_R \{0,1\}^{\ell_v - 1}$ and $v'' := 2^{\ell_v - 1} + \tilde{v}$ are calculated.

2.2.3 It is designated that $m_1 = X_{\mathfrak{ID}}$, and then the following is calculated.

$$Q := \frac{Z}{U S^{v''} \Pi_{i \in A_k} R_i^{m_i}}$$

mod n and $A := Q^{e^{-1} \bmod p'q'}$ mod n (A, e, v") is transmitted to the recipient.

With regard to $m_1 = X_{\mathfrak{ID}}$, a signature is generated with the blind identifier of the credential issuer added to attribute No. 1, and the signature is used later as a base for a verifier in the anonymous authentication system to determine the validity of the issuer.

2.2.4 The issuer stores Q, $A_k$ (the value and the struct), v", and context in a file (used for a credential update)

2.3 The issuer generates a proof of correctness as follows:

$$SPK\{(e^{-1}) : A \equiv \pm Q^{e^{-1}} (\bmod n)\}(n_3).$$

2.3.1 $\tilde{A} := Q^r$ (mod n) corresponding to $r \in_R \mathbb{Z}^*_{p'q'}$ is calculated.

2.3.2 $c' := H(\text{context} \| Q \| A \| \tilde{A} \| n_3)$ is calculated.

2.3.3 $s_e := r - c'e^{-1}$ (mod p'q') is calculated. The proof is $P_2 \leftarrow (S_e, c')$.

2.4 Issuer→recipient: (A, e, v"), $P_2$, and $(m_i)_{i \in A_k}$

Round 3

3.1 v:=v"+v' is calculated.

3.2 The recipient verifies (A, e, v) using a CL signature verification algorithm.

3.2.1 Whether e is a prime number is checked, and $e \in [2^{\ell_e - 1}, 2^{\ell_e - 1} + 2^{\ell'_e - 1}]$ is verified.

3.2.2 It is set that $m_1 := X_{\mathfrak{ID}}$, and $$Q := \frac{Z}{S^v \Pi_{i \in S} R_i^{m_i}}$$

mod n is calculated.

With regard to $m_1 := X_{\mathfrak{ID}}$, the recipient inserts the blind identifier of a group member to his or her attribute so that a verifier may verify the validity of the issuer later.

3.2.3 $\hat{Q} := A^e$ mod n is calculated.

3.2.4 In the case of Q≠Q̂ (mod n), the credential issuance protocol is terminated.

3.3 The recipient verifies $P_2$.

3.3.1 $\hat{A} := A^{c'} Q^{S_e}$ mod n is calculated.

3.3.2 $\hat{c} := H(\text{context} \| Q \| A \| \hat{A} \| n_3)$ is calculated.

3.3.3 In the case of ĉ≠c', the credential issuance protocol is terminated.

3.4 (Output) When operations 3.2 and 3.3 are successful, the credential $(m_i)_{i \in A}$, (A, e, v) is stored.

4. A credential update procedure (issuer and recipient) of the anonymous authentication system application method will be described below.

Round 1

1.1 $(\overline{m}_i)_{A_k}$ is an attribute value of a credential to be updated.

1.2 $\Delta m_i = \overline{m}_i - m_i$ 1.3 The issuer loads a previously stored object from an update file.

1.4 The issuer generates a CL signature for the attribute.

1.4.1 A random prime number is selected.

$$e \in_R [2^{\ell_e - 1}, 2^{\ell_e - 1} + 2^{\ell'_e - 1}]$$

1.4.2 The random integer $\tilde{v} \in_R \{0,1\}^{\ell_v - 1}$ is selected, and $\bar{v}'' := 2^{\ell_v - 1} + \tilde{v}$ and $\Delta v'' := \bar{v}'' + v''$ are calculated.
1.4.3

$$\bar{Q} := \frac{Q}{\left(\prod_{i \in A_k} R_i^{\Delta m_i}\right) s^{\Delta v''}}$$

mod n and $\bar{A} := \bar{Q}^{e^{-1} \bmod p'q'}$ mod n are calculated.
1.4.4 It is set that $Q := \bar{Q}$, $v'' := \bar{v}''$, $m_i := \bar{m}_i$, and $A := \bar{A}$.
1.5 The issuer generates the following proof of correctness:

$$P_2 := SPK\{(e^{-1}) : A = \pm Q^{e^{-1}} (\bmod n)\}(n_3).$$

1.7 The issuer sends (A, e, v''), $P_2$ and $(m_i)_{i \in A_k}$ to the recipient.
1.7 The issuer updates the file with objects such as Q, v'', and $\{m_i : i \in A_k\}$ (used for a credential update)
Round 2
2.1 The recipient loads a previously stored object from an update file.
2.2 The recipient verifies $P_2$.
2.2.1 Q and $\hat{Q} = A^{c'} Q^{S_e}$ are calculated.
2.2.2 $\hat{c} = H(context\|Q\|A\|\hat{Q}\|n_3$ is calculated.
2.2.3 In the case of $\hat{c} \neq c'$, the credential issuance protocol is terminated.
2.3 The recipient calculates $v = v'v''$ and stores the calculation result.
2.4 The recipient verifies (A, e, v) using a CL signature verification algorithm.
2.4.1 Whether e is a prime number is checked, and $e \in [2^{\ell_e - 1}, 2^{\ell_e - 1} + 2^{\ell'_e - 1}]$ is verified.
2.4.2 $Z \equiv A^e R_1^{m_1} \ldots R_l^{m_l} S^v (\bmod n)$ is verified.
2.5 When operations 2.2 and 2.4 are successful, the credential $(m_1, \ldots, m_l, (A, e, v))$ is output, and the recipient updates the corresponding record for this credential.
5. A proof data generation procedure (recipient) of the anonymous authentication system application method will be described below.

A proof data verification method includes an operation of implementing all sub-protocols (a CL signature proving protocol, an AND operation proof generation protocol, etc.) along with execution of a proof generation protocol to calculate a value corresponding to a T value of the protocol, an operation of generating a challenge (c) value, an operation of calculating S values of all the sub-protocols using the c value, and an operation of transmitting the proof data to a verifier.

A protocol for generating a proof will be described below Inputs are $m_S$, {cred}, $\mathcal{S}$, {comm}, {rep}, {nym}, {dNym}, {verEnc}, and {msg}, and outputs are non-interactive proofs of a condition present in $\mathcal{S}$ : (Common, c, s).

{cred} is a credential, {comm} is a commitment, {rep} is a representation, {nym} is a pseudonym, {dNym} is a domain pseudonym, {verEnc} is verifiable encryption, {msg} is a message, $\mathcal{P}$ is a set of predicates specified in $\mathcal{S}$, $\mathcal{I}_r$ is a set of exposed identifiers, $\mathcal{I}_{\bar{F}}$ is a set of unexposed identifiers, and $n_1$ is a nonce generated by a verifier.
0. Setup
0.1 $\hat{v}_i(\tilde{m}_i) \in_R \{0,1\}^{\ell_n + \ell_\emptyset + \ell_H}$ is generated for each hidden identifier $v_i \in V_h$, and the generated values are stored in each identifier.
1. A t value is calculated.
1.1 Each p in $\mathcal{P}$ calls an appropriate sub-proving protocol. Each sub-proving protocol accesses the list T to store a t value and accesses the list Common to store a common value. The sub-proving protocol may access a random value generated in operation 0.1. In the present invention, it is assumed that a partial protocol is maintained in a state until the proof is finished (until the t and s values end).
2. A challenge is calculated.
2.1 The challenge c:

$$c := H(\text{context}, \text{Common}, T, \{\text{comm}\}, \{\text{rep}\}, \{\text{nym}\},\\ \{d\text{Nym}\}, \{\text{verEnc}\}, \{\text{msg}\}, n_1)$$

3. A response is calculated.
3.1 Each predicate $p \in \mathcal{P}$ calls an appropriate sub-proving protocol. The sub-proving protocol outputs the s value as necessary. The s value is indexed with a predicate or identification name.
4. Proof data is output.
4.1 Proof data (c, s, Common) is output. When s and S are given, a verifier may easily determine a correct s value to use the struct of s in a verification period.

The CL signature proving protocol will be described below.

The CL signature proving protocol proves a credential owned by the protocol to be valid with the credential randomized.

Inputs are cred, CLPredicate p, and [c]. As for outputs, one t value and a common value A' are output in the case of $c = \perp$, and otherwise, three s values are output.
1. A signature is randomized.
1.1 $r_A \in_R \{0,1\}^{\ell_n + \ell_\emptyset}$
1.2 A CL signature is randomized as follows. A randomized signature value is (A', e, v').

$$A' := AS^{r_A} (\bmod n)$$

$$v' := v - e r_A (\text{in } \mathbb{Z})$$

Additionally, $e' := e - 2^{\ell_e - 1}$ is calculated.
2. A t value is calculated.
2.1 $\tilde{e} \in_R \{0,1\}^{\ell_n + \ell_\emptyset + \ell_H}$, $\tilde{v}' \in_R \{0,1\}^{\ell_n + \ell_\emptyset + \ell_H}$
2.2 A random value $\tilde{m}_i$ corresponding to each identifier $i \in \mathcal{I}_{\bar{F}}$ is recovered.

$$\tilde{Z} := (A')^{\tilde{e}} \left(\prod_{i \in \mathcal{I}_{\bar{F}}} R_i^{\tilde{m}_i}\right) (S^{\tilde{v}'}) \bmod n.$$

3. The t value $\tilde{Z}$ and the common value A' are output.
4. s values are calculated. The following is calculated within a $\mathbb{Z}$ range.
4.1 $\hat{e} := \tilde{e} + ce' (= \tilde{e} + c(e - 2^{\ell_e - 1}))$
4.2 $\hat{v}' := \tilde{v}' + cv'$
4.3 $\hat{m}_i := \tilde{m}_1 + cm_i$ for $i \notin \mathcal{I}_r$ An AND operator proof generation protocol will be described below.

Inputs are PrimeEncodePredicate p (with AND operator) and [c]. As for outputs, two t values and a common value are output in the case of $c = \perp$, and otherwise, two s values are output.
1. m is committed (commitment calculation).
1.1 $r \in_R \{0,1\}^{\ell_n}$
1.2 $C = Z^m S^r \pmod n$
2. t values are calculated.
2.1 A random integer is selected.

$$\tilde{m}_h \in_R \pm \{0,1\}^{\ell_m + \ell_\emptyset + \ell_H + 1 - \ell_{m_r}}, \tilde{r} \in_R \pm \{0,1\}^{\ell_n + \ell_\emptyset + \ell_H + 1}$$

2.2 The following is calculated.

$$\tilde{C} = (Z^{m_r})^{\tilde{m}_h} S^{\tilde{r}} \pmod{n}$$

$$\tilde{C}_0 := Z^{\tilde{m}} S^{\tilde{r}}$$

3. The t values $\tilde{C}$ and $\tilde{C}_0$ and the common value C are calculated.
4. S values are calculated. The following is calculated within a $\mathbb{Z}$ range.
  4.1 $\hat{m}_h := \tilde{m}_h + cm_h$
  4.2 $\hat{r} := \tilde{r} + cr$ A NOT operator proof generation protocol will be described below.

Inputs are PrimeEncodePredicate p (with the NOT operator) and [c]. As for outputs, one t value and a common value are output in the case of $c = \perp$, and otherwise, three s values are output.

1. m is committed, and an exponent is calculated.
  1.1 $r \in_R \{0,1\}^{\ell_n}$
  1.2 $C = Z^m S^r \pmod{n}$
  1.3 $\tilde{m}, \tilde{r} \in_R \pm \{0,1\}^{\ell_m + \ell_\phi + \ell_H + 1}$
  1.4 a and b are calculated to satisfy $ma + m_r b = 1$.
  1.5 $r' := ra$
2. A t value is calculated.
  2.1 $\tilde{r}', \tilde{a}, \tilde{b} \in_R \pm \{0,1\}^{\ell_m + \ell_\phi + \ell_H + 1 - n_i \ell_t}$
  2.2 $\tilde{C} := C^{\tilde{a}} (Z^{m_r})^{\tilde{b}} S^{\tilde{r}'} \pmod{n}$
3. The t value $\tilde{C}$ and the common value C are output.
4. s values are calculated and output. The following is calculated within a $\mathbb{Z}$ range.
  4.1 $\hat{r}' := \tilde{r}' + cr'$
  4.2 $\hat{a} := \tilde{a} + ca$
  4.3 $\hat{b} := \tilde{b} + cb$ An inequality proof generation protocol will be described below. This is a proving protocol for $<, \leq, >$ and $\geq$ operators.

Inputs are InequalityPredicate p and [c]. As for outputs, six t values and five common values are output in the case of $c = \perp$, and otherwise, ten 3 values are output.

1. Proof setup
  1.1 Definition $$\Delta := \begin{cases} b - m & \text{if } * \equiv \leq \\ b - m - 1 & \text{if } * \equiv < \\ m - b & \text{if } * \equiv \geq \\ m - b - 1 & \text{if } * \equiv > \end{cases}$$

and $$a := \begin{cases} -1 & \text{if } * \equiv \leq \text{ or } < \\ 1 & \text{if } * \equiv \geq \text{ or } > \end{cases}$$

When conditional expressions hold true, $\Delta$ is represented as a positive number. Therefore, in the case of $\Delta < 0$, the proof is considered to be failed, and $\perp$ is returned.

1.2 $\Delta$ is represented as the sum of four squares.

$$\Delta := u_1^2 + u_2^2 + u_3^2 + u_4^2$$

1.3 $r_i \in_R \{0,1\}^{\ell_n + \ell_\phi}$ is selected, and the following is calculated.

$$T_1 := Z^{u_1} S^{r_1} \pmod{n} \quad T_2 := Z^{u_2} S^{r_2} \pmod{n}$$
$$T_3 := Z^{u_3} S^{r_3} \pmod{n} \quad T_4 := Z^{u_4} S^{r_4} \pmod{n}$$
$$T_\Delta := Z^\Delta S^{r_\Delta} \pmod{n}$$

Then, $r_\Delta$, $r_i$, $T_\Delta$, and $T_i$ are calculated.

2. t values are calculated.
  2.1 $\tilde{u}_i \in_R \{0,1\}^{\ell_m + \ell_H + \ell_\phi}$ and $\tilde{r}_i, \tilde{r}_\Delta \in_R \{0,1\}^{\ell_m + \ell_H + 2\ell_\phi}$ are selected, and the following is calculated $$\hat{T}_1 := Z^{\tilde{u}_1} S^{\tilde{r}_1} \pmod{n} \quad \hat{T}_2 := Z^{\tilde{u}_2} S^{\tilde{r}_2} \pmod{n}$$
$$\hat{T}_3 := Z^{\tilde{u}_3} S^{\tilde{r}_3} \pmod{n} \quad \hat{T}_4 := Z^{\tilde{u}_4} S^{\tilde{r}_4} \pmod{n}$$
$$\hat{T}_\Delta := Z^{\tilde{m}} (S^a)^{\tilde{r}_\Delta} \pmod{n}$$

$\tilde{m}$ is a random value shared among sub-proving protocols.
  2.2 $\tilde{\alpha} \in_R \{0,1\}^{\ell_n + \ell_m + 2\ell_k + 2\ell_\phi + 3}$ is selected, and the following is calculated.

$$Q := T_1^{\tilde{u}_1} T_2^{\tilde{u}_2} T_3^{\tilde{u}_3} T_4^{\tilde{u}_4} S^{\tilde{\alpha}} \pmod{n}$$

2.3 The t values are output: $\hat{T}_1, \ldots \hat{T}_4, \hat{T}_\Delta$, and Q
  2.4 Output commons: $T_1, \ldots, T_4$, and $T_\Delta$
3. s values are calculated.
  3.1 With respect to $i \in \{1,2,3,4\}$, $$\hat{u}_i := \tilde{u}_i + cu_i,$$

3.2 $\hat{r}_i := \tilde{r}_i + cr_i$,
  3.3 $\hat{r}_\Delta := \tilde{r}_\Delta + cr_\Delta$, and
  3.4 $\alpha := r_\Delta - \sum_{j=1}^{4} u_j r_j$ are calculated, and $\hat{\alpha} := \tilde{\alpha} + c\alpha$ is output.

A commitment proof generation protocol will be described below.

Inputs are comm, CommitmentPredicate p, and [c]. As for outputs, one t value is output in the case of $c = \perp$, and otherwise, one s value is output.

The commitment comm is represented as $C := R_1^{a_1} R_2^{a_2} \ldots R_L^{a_L} S^r$. $R_i$ and S are public keys of an issuer, and $a_1, \ldots,$ and $a_L$ are commit values.

1. A t value is calculated.
  1.1 A random integer is selected.

$$\tilde{r} \in_R \pm \{0,1\}^{\ell_n + \ell_m + \ell_H + 1}$$

1.2 $\tilde{m}_i$ is a value selected in the proof generation operation 0.1, and the following is calculated.

$$C' := \left( \prod_{i \in \mathcal{I}_{\tilde{r}}} R_i^{\tilde{m}_i} \right) S^{\tilde{r}} \pmod{n}$$

2. A response value is calculated.
  2.1 Calculation is performed within a $\mathbb{Z}$ range, and $\hat{r} := \tilde{r} + cr$ is output.

A representation proof generation protocol will be described below.

Inputs are rep, RepresentationPredicate p, and [c]. As for outputs, one t value is output in the case of $c = \perp$, and otherwise, one s value is output.

1. The following values are calculated, and a t value is output. $\tilde{R} = \Pi g_j^{\tilde{m}_j}$ is calculated with respect to all j of $x_j$ corresponding to a hidden identifier.

As for a representation, bases of commitment generally include a public key, but when the corresponding base is randomly selected, the base is referred to as a representation.

A pseudonym/domain pseudonym proof generation protocol will be described below.

Inputs are nym and/or dNym, NymPredicate and/or DomNymPredicate p, and [c]. As for outputs, one t value is output in the case of $c = \perp$, and otherwise, one s value is output.

1. A t value is calculated.
1.1 A random integer value is selected.

$$\tilde{r} \in_R \mathbb{Z}_\rho$$

1.2 The following is calculated with respect to the value $\tilde{m}_5$ selected in the proof generation operation 0.1.

$$n\tilde{y}m := g^{\tilde{m}_5}h^{\tilde{r}} (\bmod \Gamma) \text{ if } nym \neq \perp \text{ and}$$

$$d\tilde{N}ym := g_{dom}^{\tilde{m}_5} (\bmod \gamma) \text{ if } dNym \neq \perp$$

(The index numbers of attribute values including pseudonym information of a recipient are changed to attribute values used for issuer verification)
2. An s value is generated and output.

$$\hat{r} := \tilde{r} + cr (\bmod \mathbb{Z})$$

A verifiable encryption proof generation protocol will be described below. This is a proving protocol for attribute-verifiable encrypted values.

Inputs are verEnc, VerEncPredicate p, and [c]. As for outputs, three t values are output in the case of c=⊥, and otherwise, one s value is output.
1. t values are calculated.
1.1 A random integer value is selected.

$$\tilde{r} \in R \pm \{0,1\}^{2\ell_{enc}+\ell_\phi+\ell_H+1}$$

1.2 The following is calculated.

$$\hat{u} := g^{2\tilde{r}}, \hat{e} := y_1^{2\tilde{r}} h^{2\tilde{m}} \text{ and } \hat{v} := (y_2 y_3^{\mathcal{H}_{hk}(u,e,L)})^{2\tilde{r}}$$

1.3 The t values are output: $\hat{u}$, $\hat{e}$, and $\hat{v}$
2. An s value is calculated: $\hat{r} := \tilde{r} + cr$
The predicate p includes a public key.
Ciphertext (u, v, e) and a random value r are loaded by a prover.
6. A proof verification procedure (verifier) of the anonymous authentication system application method will be described below.

A proof verification protocol will be described below. This is an algorithm for verifying a proof received from a recipient.

Inputs are S, P=(c, s, Common), and $n_1$, and an output is the approval or rejection of P.
1. A $\hat{t}$ value is calculated.
1.1 Each predicate $p \in \mathcal{P}$ calls an appropriate sub-verification protocol. Each sub-verifier accesses the list $\hat{T}$ to store an appropriate common value and the $\hat{t}$ value from Common. The sub-verification protocol may access s values.
2. A verification challenge is calculated.
2.1 c:=H(context, Common, $\hat{T}$, {comm}, {rep}, {nym}, {dNym}, {verEnc}, {msg}, $n_1$)
3. It is checked whether challenge values are identical to each other.
3.1 In the case of c=ĉ, P is approved, and otherwise, P is rejected.

A CL signature data verification protocol will be described below.

This is a protocol for checking that a credential received from a recipient is a valid credential.

Inputs are a credential struct and CLPredicate p, and an output is one value.
1. Calculation is performed as follows.

$$\hat{T} := \left( \frac{Z}{(\prod_{i \in \mathcal{J}_r} R_i^{m_i})(A')^{2\ell_e-1}} \right)^{-c} (A')^{\hat{e}} \left( \prod_{i \in \mathcal{J}_{\tilde{r}}} R_i^{\tilde{m}_i} \right) S^{\tilde{v}'} \bmod n$$

2. A length is verified.

$$\hat{m}_i \in \pm \{0,1\}^{\ell_m+\ell_\phi+\ell_H+1} \text{ for } i \in A_{\tilde{r}}$$

$$\hat{e} \in \pm \{0,1\}^{\ell'_e+\ell_\phi+\ell_H+1}$$

3. $\hat{T}$ is output.

An AND operator proof verification protocol will be described below. This protocol determines the validity of an AND operator proof.

An input is PrimeEncodePredicate p (with AND operator), and an output is one $\hat{t}$ value.
1. The following is calculated.

$$\hat{C} := C^{-c}(Z^{m_r})^{\tilde{m}_h} S^{\tilde{r}} (\bmod n) \text{ and}$$

$$\hat{C}_0 := C^{-c} Z^{\tilde{n}} S^{\tilde{r}} (\bmod n)$$

2. The length is verified.

$$\hat{m}_h \in \pm \{0,1\}^{\ell_m+\ell_\phi+\ell_H+1-\ell_{Br}}$$

3. $\hat{C}$ and $\hat{C}_0$ are output.

A NOT operator proof verification protocol will be described below. This protocol determines the validity of a NOT operator proof.

An input is PrimeEncodePredicate p (with NOT operator), and an output is one $\hat{t}$ value.

$\hat{m}$ is assumed to be an s value corresponding to an identifier designated in p, and $m_r$ is assumed to be a constant. $\hat{m}'$, $\hat{a}$, $\hat{b}$, and C are output values of the protocol.
1. The following is calculated.

$$\hat{C} := Z^c C^{\hat{a}} (Z^{m_r})^{\hat{b}} S^{\tilde{n}} (\bmod n)$$

2. The length is verified.

$$\hat{m}_i \in \pm \{0,1\}^{\ell_m+\ell_\phi+\ell_H+1}, \text{ for } i \notin A_r$$

3. $\hat{C}$ is output.

An inequality proof verification protocol will be described below. This is a proof verification protocol for $\leq$, $>$, and $\geq$ operators.

An input is InequalityPredicate p, and an output is one $\hat{t}$ value.
1. When necessary, Δ' is calculated, and c is updated, $$\Delta' := \begin{cases} b & \text{if } * \equiv \leq \\ b-1 & \text{if } * \equiv < \\ b & \text{if } * \equiv \geq \\ b+1 & \text{if } * \equiv > \end{cases}$$

$$a := \begin{cases} -1 & \text{if } * \equiv \leq \text{ or } < \\ 1 & \text{if } * \equiv \geq \text{ or } > \end{cases}$$

$$\Delta' = m - a\Delta$$

2. A t value is calculated.
2.1 The following value is calculated.

$$\hat{T}_\Delta := (T_\Delta^a Z^{\Delta'})^{-c} Z^{\tilde{n}} (S^a)^{\hat{r}_\Delta} (\bmod n)$$

2.2 The following calculation is performed with respect to $i \in \{1, \ldots, 4\}$.

$$\hat{T}_i := T_i^{-c} Z^{\tilde{v}_i} S^{\hat{r}_i} (\bmod n)$$

2.3. The following value is calculated.

$$\hat{Q} := (T_\Delta)^{-c} T_1^{\tilde{u}_1} T_2^{\tilde{u}_2} T_3^{\tilde{u}_3} T_4^{\tilde{u}_4} S^{\hat{\alpha}} (\bmod n)$$

3. t values $\hat{T}_\Delta$, $\hat{T}_1$, ..., $\hat{T}_4$, and $\hat{Q}$ are output.

A commitment proof verification protocol will be described below.

Inputs are comm and CommitmentPredicate p, and an output is one value.

$\hat{r}$ is an s value, and $\mathcal{I}_{\bar{r}}$ and $\mathcal{I}_r$ are values defined by a commitment proof generation protocol.

1. The following values are calculated.

$$C' := \frac{C}{\prod_{i \in \mathcal{I}_r} R_i^{a_i}} (\text{mod } n),$$

$$\hat{C} := (C')^{-c} \left( \prod_{i \in \mathcal{I}_{\bar{r}}} R_i^{\hat{m}_i} \right) S^{\hat{r}} (\text{mod } n)$$

2. $\hat{C}$ is output.

A pseudonym/domain pseudonym proof verification protocol will be described below.

Inputs are nym or dNym and PseudonymPredicate or DomainNymPredicate p, and an output is one $\hat{t}$ value.

p is a protocol indicating the value $\hat{r}$.

1. The following values are calculated.

$n\hat{y}m := nym^{-c} g^{\hat{n}s} h^{\hat{r}} (\text{mod } \Gamma)$ if $nym \neq \perp$ and $d\hat{N}ym := nym^{-c} g_{dom}^{\hat{m}s} (\text{mod } \Gamma)$ if $dNym \neq \perp$ (The index numbers of attribute values including pseudonym information of a recipient are changed to attribute values used for issuer verification)

2. $n\hat{y}m$ and/or $d\hat{N}ym$ are output.

A verifiable encryption proof verification protocol will be described below. This is a proof verification protocol for attribute-verifiable encrypted values.

Inputs are verEnc and ProveVerEnc p, and outputs are three $\hat{t}$ values.

p is a protocol which receives the values $\hat{m}_1$ and $\hat{r}$.

1. The following values are calculated.

$\hat{u} := u^{-2c} g^{2\hat{r}}$ $\hat{e} := u^{-2c} y_1^{2\hat{r}} h^{2\hat{m}_1}$, and $\hat{v} := u^{-2c} (y_2 y_3^{\mathcal{H}_{hk}(u,e,L)})^{2\hat{r}}$ 2. $\hat{u}$, $\hat{e}$, and $\hat{v}$ are output.

7. Others

Figure 17:
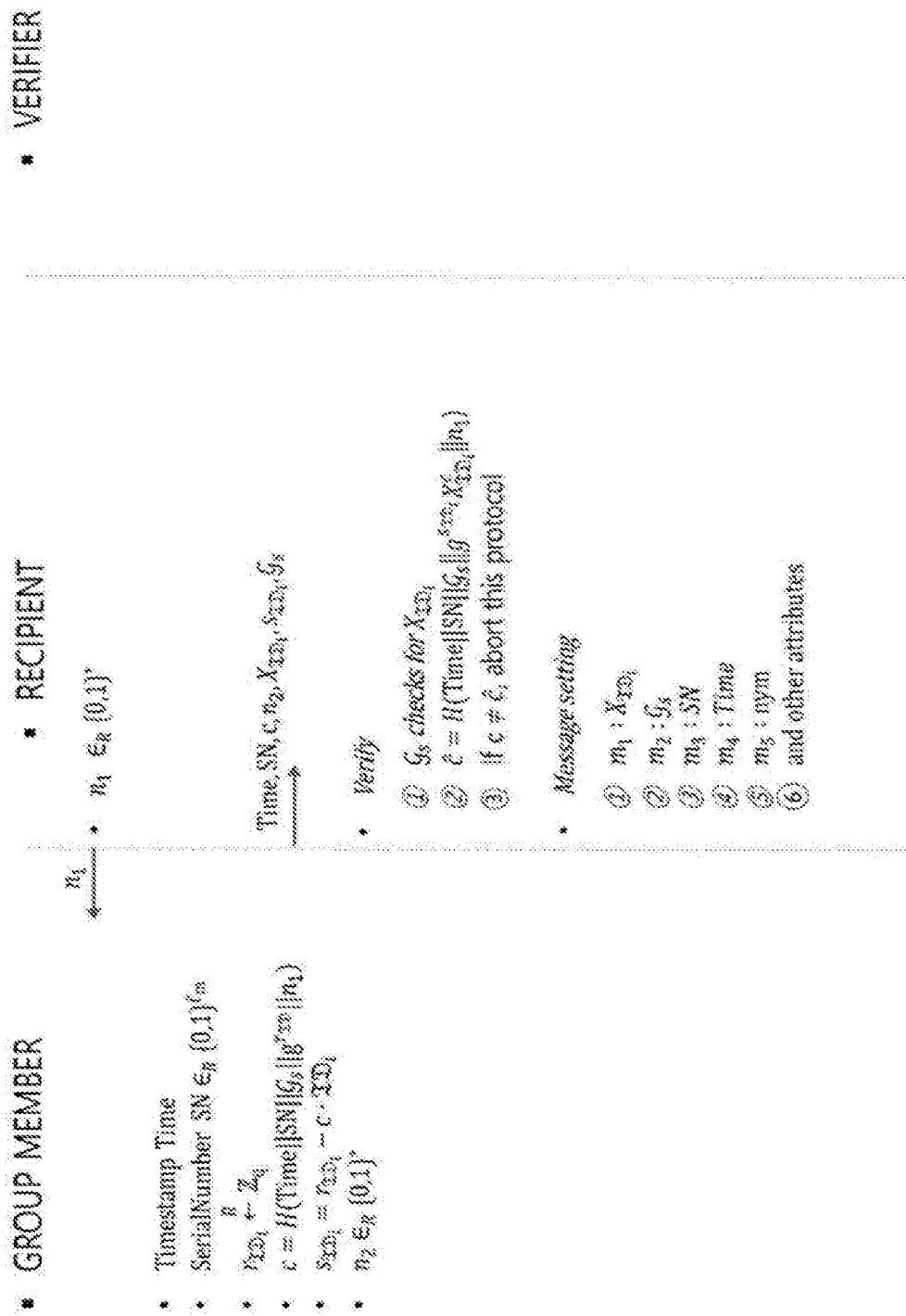
FIGS. 17 to 19 illustrate flow among a group member, a recipient, and a verifier according to the exemplary embodiment of the present invention.
Figure 18:
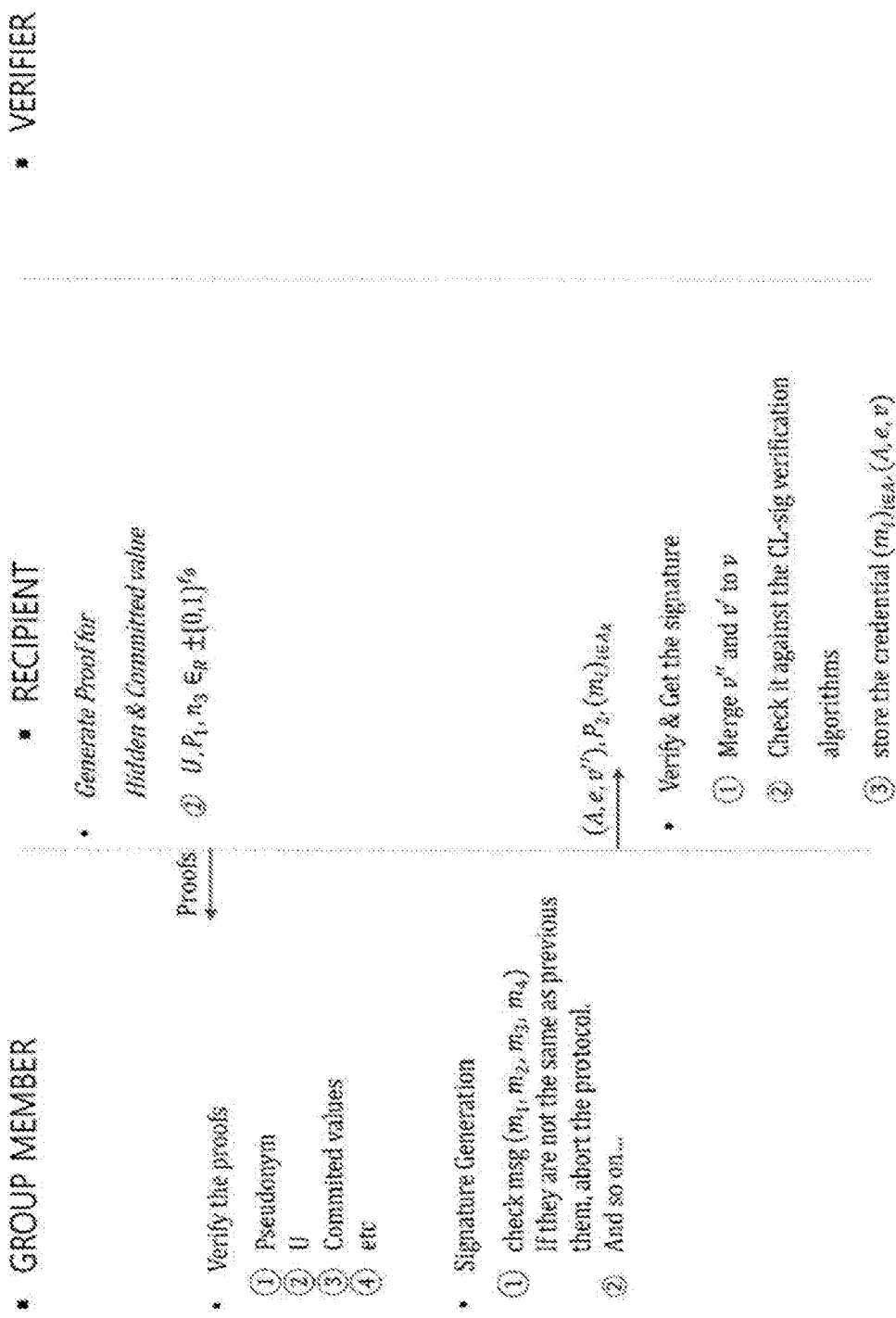
Figure 19:
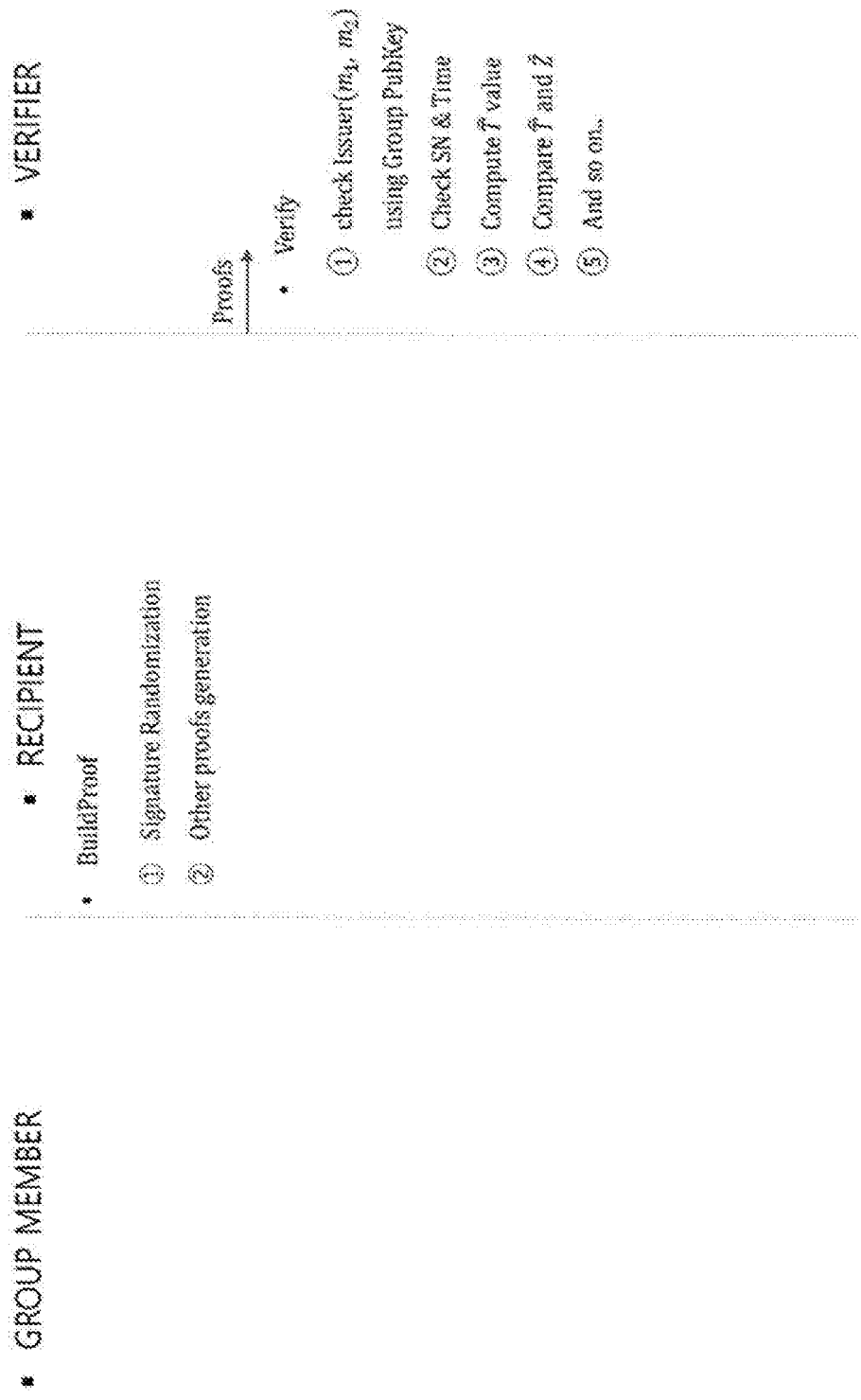
Figure 20:
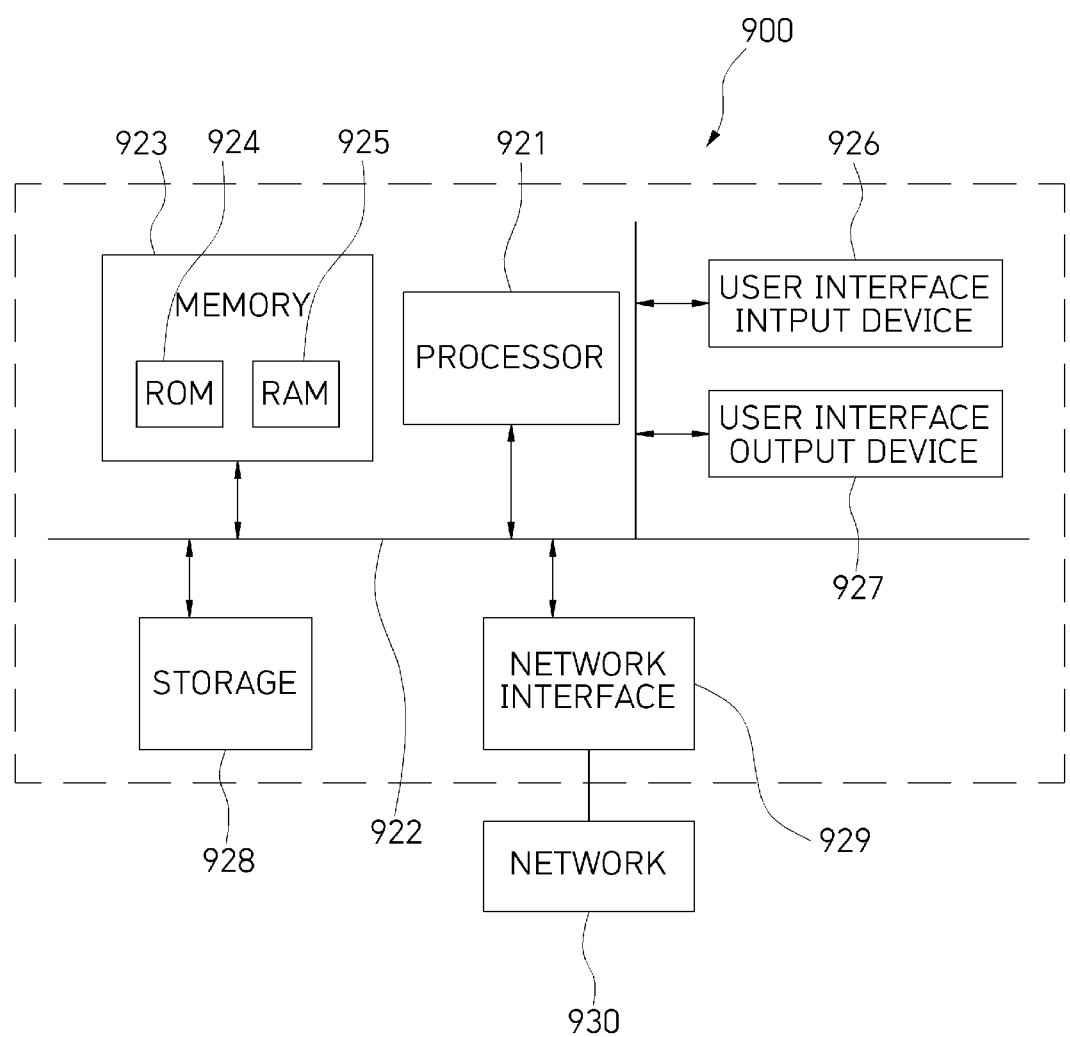
FIG. 20 is a view illustrating an example of a computer system in which a method according to an embodiment of the present invention is performed.

FIGS. 17 to 19 illustrate flow among a group member, a recipient, and a verifier according to the exemplary embodiment of the present invention.

Meanwhile, the decentralized group signature method for an issuer-anonymized credential system according to the exemplary embodiment of the present invention may be implemented in a computer system or recorded in a recording medium. The computer system may include at least one processor, a memory, a user input device, a data communication bus, a user output device, and a storage. Each of these elements performs data communication through a data communication bus.

The computer system may further include a network interface coupled to a network. The processor may be a central processing unit (CPU) or a semiconductor device that processes a command stored in a memory and/or a storage.

The memory and storage may include various forms of volatile or non-volatile storage media. For example, the memory may include a read only memory (ROM) and a random access memory (RAM).

Consequently, the decentralized group signature method for an issuer-anonymized credential system according to the exemplary embodiment of the present invention may be implemented in a computer-executable manner. When the decentralized group signature method for an issuer-anonymized credential system according to the exemplary embodiment of the present invention is performed in a computer device, the group signature method may be performed by computer-readable commands.

Meanwhile, the above-described decentralized group signature method for an issuer-anonymized credential system according to the exemplary embodiment of the present invention can be implemented as a computer-readable code in a computer-readable recording medium. The computer-readable recording medium may include all types of recording media storing data that is interpretable by a computer system. Examples of the computer-readable recording media may include a ROM, a RAM, a magnetic tape, a magnetic disc, a flash memory, an optical data storage device, and the like. Also, the computer-readable recording medium may be distributed over a computer system connected by a computer communication network and stored and executed as a code which is readable in a distributed manner.

The present invention provides a decentralized group signature scheme for serving as a group manager with agreement of group members without a representative.

According to the present invention, since each group member can make an initial setup without using a reliable organization or a specific reliable member, security is high. Also, the present invention can be used in a credential system to provide anonymity of issuers.

Effects of the present invention are not limited to those mentioned above, and other effects which have not been mentioned will be clearly understood by those of ordinary skill in the art from the above description.

The present invention has been described in detail above with reference to the exemplary embodiments. Those of ordinary skill in the art should be able to understand that various modifications and alterations can be made without departing from the essential characteristics of the present invention. Therefore, it should be understood that the disclosed embodiments are not limiting but illustrative in all aspects. The scope of the present invention is defined not by the above description but by the following claims, and it should be understood that all changes or modifications equivalent to the claims fall within the scope of the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

The method according to an embodiment of the present invention may be implemented in a computer system or may be recorded in a recording medium. FIG. 16 illustrates a simple embodiment of a computer system. As illustrated, the computer system may include one or more processors 921, a memory 923, a user input device 926, a data communication bus 922, a user output device 927, a storage 928, and the like. These components perform data communication through the data communication bus 922.

Also, the computer system may further include a network interface 929 coupled to a network. The processor 921 may be a central processing unit (CPU) or a semiconductor device that processes a command stored in the memory 923 and/or the storage 928.

The memory 923 and the storage 928 may include various types of volatile or non-volatile storage mediums. For example, the memory 923 may include a ROM 924 and a RAM 925.

Thus, the method according to an embodiment of the present invention may be implemented as a method that can be executable in the computer system. When the method according to an embodiment of the present invention is performed in the computer system, computer-readable commands may perform the producing method according to the present invention.

The method according to the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

What is claimed is:

1. A decentralized group signature method for an issuer-anonymized credential system, the decentralized group signature method comprising:
   (a) an initial system setup operation of defining (i) elements of a group signature method and (ii) information that is generated and shared by each group member;

(b) an initial group member setup operation in which each group member generates and combines polynomials for group signature, signature verification, participation, revoking, and anonymity removal;

(c) a group member participation operation of adding a new group member to a group;

(d) a group signature operation of putting the group signature on a specific message;

(e) an operation of verifying the group signature;

(f) an operation of removing anonymity from the group signature for a specific group member with agreement of group members; and (g) an operation of revoking a specific group member with agreement of the group members, wherein exclusive authority of a group manager is distributed to the group members by allowing each group member to perform the operations (a)-(g), wherein the operation (b) comprises:

an operation of generating a polynomial of each group member;

an operation of sharing polynomial verification data of each group member;

an operation of sharing a polynomial value of each group member;

an operation of combining the polynomial and the polynomial verification data of each group member; and an operation of verifying the combined polynomial and polynomial verification data of each group member, wherein the operation of sharing the polynomial verification data of each group member comprises generating and sharing a public parameter by each group member.

2. The decentralized group signature method of claim 1, wherein in the operation (a), the group members know number of initial group members, a quorum required for agreement, public keys of the group members, a hash function, and a commitment generation function, and the group members generate public key pairs and identifier pairs, and share public values with one another.

3. The decentralized group signature method of claim 1, wherein the operation of generating the polynomial of each group member comprises generating a polynomial used for anonymity removal and a polynomial used for signing.

4. The decentralized group signature method of claim 1, wherein the operation of sharing the polynomial verification data of each group member comprises generating a polynomial commitment value for checking integrity of the polynomial and generating and sharing, by each group member, a public parameter.

5. The decentralized group signature method of claim 1, wherein the operation of sharing the polynomial value of each group member comprises calculating a polynomial value for a blind identifier of a group member and verifying the calculated polynomial value.

6. The decentralized group signature method of claim 1, wherein the operation of combining the polynomial and the polynomial verification data of each group member comprises combining values generated by the group members to generate a common group parameter.

7. The decentralized group signature method of claim 1, wherein the operation (c) comprises:

an operation of sharing data of each group member for participation of a new group member;

an operation of generating a polynomial of the new group member; and an operation of verifying the polynomial of the new group member.

8. The decentralized group signature method of claim 7, wherein the operation of sharing the data of each group member for participation of the new group member comprises, when a group participation request of the new group member is made using a group member identifier for inter-operation with an anonymous authentication system, making responses by existing group members.

9. The decentralized group signature method of claim 7, wherein the operation of generating the polynomial of the new group member comprises generating, by the new group member, a polynomial to be used by the new group member as a group member when the new group member responses from a preset number of members or more.

10. The decentralized group signature method of claim 9, wherein the operation of verifying the polynomial of the new group member comprises verifying, by the new group member, the polynomial generated by the new group member and specifying a group member who has given a wrong value when the verification fails.

11. The decentralized group signature method of claim 1, wherein the operation (d) comprises:

an operation of generating individual data required for signing;

an operation of verifying received individual data;

an operation of generating a polynomial to be used in checking a number of signed members;

an operation of combining the received individual data and signing a message;

an operation of transmitting partial message signature data; and an operation of verifying received partial signature data and generating a signature value.

12. The decentralized group signature method of claim 11, wherein the operation of generating the individual data required for signing comprises:

selecting, by each group member, a random value;

generating, by each group member, individual signature data to constitute a signature; and transmitting, by each group member, the generated individual signature data to other group members.

13. The decentralized group signature method of claim 1, wherein the operation (f) comprises:

sharing information on an abnormal group member; and recovering, by each manager, a polynomial, and verifying the recovered polynomial to check user information.

14. The decentralized group signature method of claim 13, wherein the operation (g) comprises revoking a group member who is disclosed in the operation (f) when a preset number of group members or more sign a revoking member list and check a value used by the specific group member to be revoked.

* * * * *